US009140877B2

(12) United States Patent
Tsai et al.

(10) Patent No.: US 9,140,877 B2
(45) Date of Patent: Sep. 22, 2015

(54) FOCUS ADJUSTING OPTICAL LENS ASSEMBLY

(71) Applicant: LARGAN Precision Co., Ltd., Taichung (TW)

(72) Inventors: Tsung-Han Tsai, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 236 days.

(21) Appl. No.: 13/803,551

(22) Filed: Mar. 14, 2013

(65) Prior Publication Data

US 2014/0218809 A1 Aug. 7, 2014

(30) Foreign Application Priority Data

Feb. 4, 2013 (TW) ............................. 102104179 A

(51) Int. Cl.

| | |
|---|---|
| ***G02B 9/60*** | (2006.01) |
| ***G02B 13/18*** | (2006.01) |
| ***G02B 3/02*** | (2006.01) |
| ***G02B 13/00*** | (2006.01) |

(52) U.S. Cl.

CPC .............. *G02B 13/0045* (2013.01); *G02B 9/60* (2013.01)

(58) Field of Classification Search

USPC .......................... 359/714, 766, 698, 785, 795

See application file for complete search history.

(56) References Cited

U.S. PATENT DOCUMENTS

| | | | | |
|---|---|---|---|---|
| 7,864,454 | B1 * | 1/2011 | Tang et al. | 359/764 |
| 2012/0262806 | A1 * | 10/2012 | Huang | 359/784 |

* cited by examiner

*Primary Examiner* — Alicia M Harrington

(74) *Attorney, Agent, or Firm* — Locke Lord LLP; Tim Tingkang Xia, Esq.

(57) ABSTRACT

A focus adjusting optical lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power. The fourth lens element with negative refractive power has a concave object-side surface and a convex image-side surface. The fifth lens element with refractive power has a concave image-side surface at a paraxial region, wherein the image-side surface of the fifth lens element changes from concave at the paraxial region to convex at a peripheral region, and both of an object-side surface and the image-side surface of the fifth lens element are aspheric.

19 Claims, 24 Drawing Sheets

FOCUS ADJUSTING OPTICAL LENS ASSEMBLY

RELATED APPLICATIONS

The application claims priority to Taiwan Application Serial Number 102104179, filed Feb. 4, 2013, which is herein incorporated by reference.

BACKGROUND

1. Technical Field

The present disclosure relates to a focus adjusting optical lens assembly. More particularly, the present disclosure relates to a compact focus adjusting optical lens assembly applicable to electronic products.

2. Description of Related Art

As the electronic products have become compact, the component size of the electronic products has been reduced, especially the photographing lens systems. In general, a compact photographing lens system usually cannot perfectly focus on an object both at a close distance and infinity under a space confinement. For example, the U.S. Pat. No. 7,864,454 discloses a five-element lens structure which is a fixed-focus lens system. It has limited capabilities in producing sharp close-ups and tends to produce peripheral blurring of images.

In addition, although the problems of fixed-focus lenses can be compensated by extended depth of field (EDOF) or voice coil motor (VCM). EDOF is a camera technique that applies the software algorithm to simulate the objects with the concept that the RGB components of light will be focused differently under different lens-object distances. As for the focusing lens driving devices such as the VCM is used to achieve focus by changing the relative distance between a whole set of lens elements and an image sensor. However, EDOF as well as VCM have problems like low image quality and more consumed power.

Inasmuch as the foregoing, a photographing system applied in the mobile electronic products for exhibiting a compact size and superior image quality is needed in the art.

SUMMARY

According to one aspect of the present disclosure, a focus adjusting optical lens assembly comprises, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power. The fourth lens element with negative refractive power has a concave object-side surface and a convex image-side surface. The fifth lens element with refractive power has a concave image-side surface at a paraxial region, wherein the image-side surface of the fifth lens element changes from concave at the paraxial region to convex at a peripheral region, and an object-side surface and the image-side surface of the fifth lens element are aspheric. When an object moves closer towards or further away the focus adjusting optical lens assembly, the focusing adjustment is performed by adjusting an axial distance between the first lens element and the second lens element along an optical axis. The focus adjusting optical lens assembly has a total of five lens elements with refractive power. When a difference of an axial distance between the first lens element and the second lens element of the focus adjusting optical lens assembly focused on an object at a close distance and infinity is $\Delta T12$, and a central thickness of the second lens element is CT2, the following relationship is satisfied:

$$0.05<|\Delta T12|/CT2<0.80.$$

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
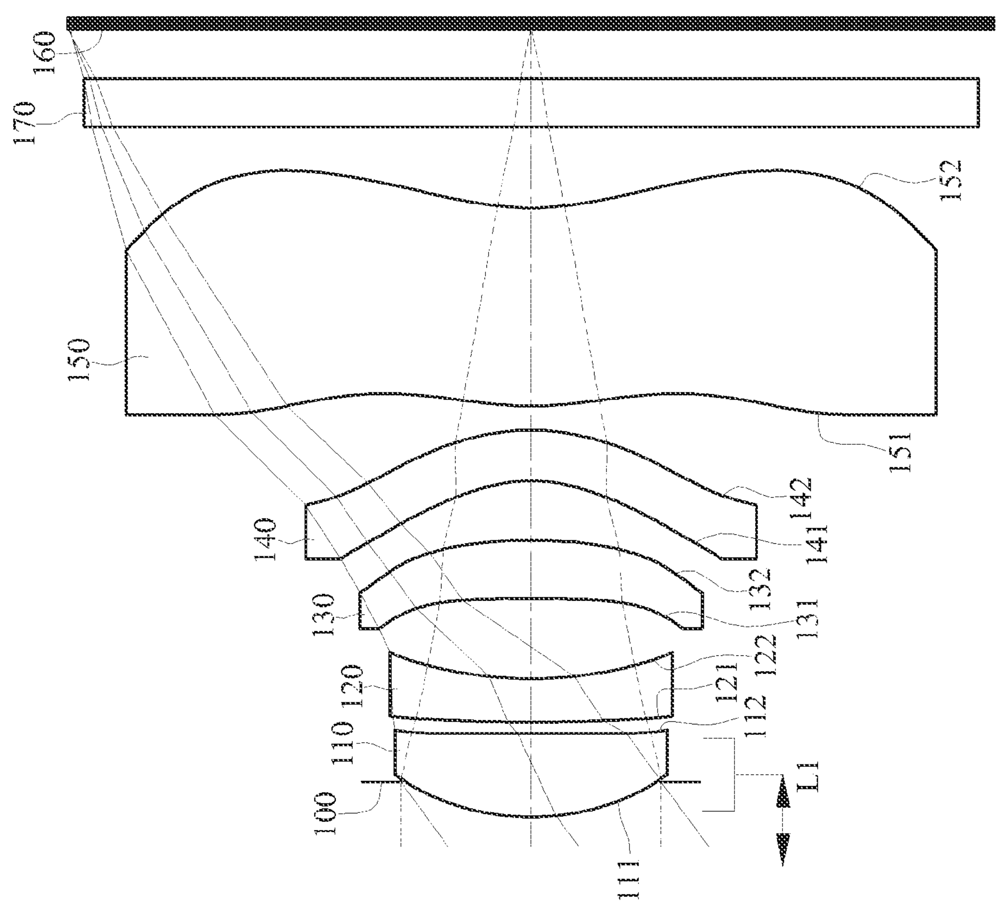
FIG. 1 is a schematic view of a focus adjusting optical lens assembly according to the 1st embodiment of the present disclosure.

A focus adjusting optical lens assembly comprises, in order from an object side to an image side, a first lens element, a second lens element, a third lens element, a fourth lens element and a fifth lens element. The focus adjusting optical lens assembly has a total of five lens elements with refractive power.

The first lens element with positive refractive power has a convex object-side surface. Therefore, it provides the focus adjusting optical lens assembly with the positive refractive power as it needs to be so as to reduce the total track length of the focus adjusting optical lens assembly.

The second lens element has negative refractive power, so that it is favorable for correcting the aberration generated from the first lens element. The second lens element can have a concave image-side surface, so that it is favorable for further correcting the aberration.

The third lens element can have positive refractive power, so that it is favorable for reducing the sensitivity of the focus adjusting optical lens assembly. The third lens element can have a convex image-side surface, so that it is favorable for reducing the astigmatism and the spherical aberration of the focus adjusting optical lens assembly.

The fourth lens element with negative refractive power has a concave object-side surface and a convex image-side surface. Therefore, it is favorable for correcting astigmatism and effectively correcting Petzval sum so as to make an image plane more flat.

The fifth lens element can have a convex object-side surface and has a concave image-side surface at a paraxial region, wherein the image-side surface changes from concave at the paraxial region to convex at a peripheral region. Therefore, it is favorable for reducing the astigmatism and effectively reducing the angle at which the incident light projects onto an image sensor from the off-axis so as to increase the responding rate of the image sensor and improve image quality.

When a difference of an axial distance between the first lens element and the second lens element of the focus adjusting optical lens assembly focused on an object at a close distance and infinity is $\Delta T12$, and a central thickness of the second lens element is $CT2$, the following relationship is satisfied: $0.05<|\Delta T12|/CT2<0.80$. Therefore, it is favorable for improving the focusing accuracy of the focus adjusting optical lens assembly focused at a close distance or infinity by a small amount of movement. Furthermore, it is favorable for maintaining a compact size and low power for the focus adjusting optical lens assembly.

When a distance between the object-side surface of the first lens element and an image plane of the focus adjusting optical lens assembly focused on the object at infinity is TLi, and a distance between the object-side surface of the first lens element and an image plane of the focus adjusting optical lens assembly focused on the object at a close distance is TLm, the following relationship is satisfied: $(|TLi-TLm|/TLi)\times 10<0.5$. Therefore, it is favorable for keeping the focus adjusting optical lens assembly compact.

When a focal length of the focus adjusting optical lens assembly focused on the object at infinity is Fi, a focal length of the fourth lens element is f4, and a focal length of the fifth lens element is f5, the following relationship is satisfied: $|Fi/f4|+|Fi/f5|<2.0$. Therefore, it is favorable for correcting the aberration and reducing the sensitivity of the focus adjusting optical lens assembly.

When a central thickness of the fourth lens element is CT4, and a central thickness of the fifth lens element is CT5, the following relationship is satisfied: $0.15<CT4/CT5<0.80$. Therefore, it is favorable for avoiding the deformed lens elements due to the lens elements with excessively thin thickness or an excessively thick thickness When the focal length of the focus adjusting optical lens assembly focused on the object at infinity is Fi, and a focal length of the focus adjusting optical lens assembly focused on the object at a close distance is Fm, the following relationship is satisfied: $0.95<Fi/Fm<1.10$. Therefore, it is favorable for improving the focusing accuracy of the focus adjusting optical lens assembly focused at a close distance and infinity.

When an Abbe number of the first lens element is V1, an Abbe number of the second lens element is V2, and an Abbe number of the fourth lens element is V4, the following relationship is satisfied: $0.6<(V2+V4)/V1<1.2$. It is favorable for correcting the chromatic aberration of the focus adjusting optical lens assembly.

When an f-number of the focus adjusting optical lens assembly is Fno, the following relationship is satisfied: $1.8<Fno<3.0$. It is favorable for making the focus adjusting optical lens assembly obtain large aperture so as to take sharp images under insufficient light conditions by fast shutter speed.

When the central thickness of the fourth lens element is CT4, the following relationship is satisfied: 0.10 mm<CT4<0.35 mm. Therefore, it provides favorable moldability and homogeneity for plastic lens elements during the injection molding process.

When the distance between the object-side surface of the first lens element and an image plane of the focus adjusting optical lens assembly focused on the object at infinity is TLi, the following relationship is satisfied: 2.0 mm<TLi<6.0 mm.

Therefore, it is favorable for keeping the focus adjusting optical lens assembly compact.

When the focal length of the focus adjusting optical lens assembly focused on the object at infinity is Fi, and a focal length of the third lens element is f3, the following relationship is satisfied: $0.5<Fi/f3<2.0$. It is favorable for reducing spherical aberration of the focus adjusting optical lens assembly.

When the focal length of the focus adjusting optical lens assembly focused on the object at infinity is Fi, and the focal length of the fourth lens element is f4, the following relationship is satisfied: $-1.0<Fi/f4<0$. Therefore, it is favorable for reducing the aberration of the focus adjusting optical lens assembly.

When the focal length of the focus adjusting optical lens assembly focused on an object at infinity is Fi, and the focal length of the fifth lens element is f5, the following relationship is satisfied: $-0.7<Fi/f5<0.7$. Therefore, it is favorable for correcting the aberration and improving the image resolution of the focus adjusting optical lens assembly.

When a distance between the object-side surface of the first lens element and the image-side surface of the fifth lens element of the focus adjusting optical lens assembly focused on the object at infinity is TDi, and a vertical distance between a maximum effective diameter position on the image-side surface of the fifth lens element and an optical axis is SD52, the following relationship is satisfied: $1.25<TDi/SD52<1.75$. It is favorable for keeping the focus adjusting optical lens assembly a compact size so as to be applied to the portable electronic products.

When the focusing adjustment of the focus adjusting optical lens assembly is performed by moving the first lens element along the optical axis; the second lens element, the third lens element, the fourth lens element, and the fifth lens element are fixed with respect to the image plane. Therefore, it is favorable for exhibiting a feature of low consumed power.

According to the focus adjusting optical lens assembly of the present disclosure, when the lens element has a convex surface, it indicates that the surface is convex at the paraxial region; and when the lens element has a concave surface, it indicates that the surface is concave at the paraxial region.

According to the focus adjusting optical lens assembly of the present disclosure, the lens elements thereof can be made of glass or plastic material. When the lens elements are made of glass material, the distribution of the refractive power of the focus adjusting optical lens assembly may be more flexible for design. When the lens elements are made of plastic material, the manufacturing cost can be effectively reduced. Furthermore, the surface of each lens element can be aspheric, so that it is easier to make the surface into non-spherical shapes to obtain more controllable variables, reduce the aberration and the number of required lens elements while constructing a focus adjusting optical lens assembly. Therefore, the total track length of the focus adjusting optical lens assembly can also be reduced.

According to the focus adjusting optical lens assembly of the present disclosure, the focus adjusting optical lens assembly can include at least one stop, there can be at least one stop provided, such as an aperture stop, a glare stop or a field stop. Said glare stop or said field stop is for eliminating the stray light and thereby improving the image resolution thereof.

Furthermore, an aperture stop can be configured as a front stop or a middle stop. The front stop disposed between an object and the first lens element can provide a longer distance from an exit pupil of the focus adjusting optical lens assembly to the image plane to produce the telecentric effect and improve the image responding efficiency of an image sensor. The middle stop disposed between the first lens element and the image plane is favorable for enlarging the field of view of the system and thereby provides a wider field of view for the same.

According to the focus adjusting optical lens assembly of the present disclosure, the focus adjusting optical lens assembly is featured with good correction ability and high image quality, and can be applied to 3D (three-dimensional) image capturing applications, in products such as digital cameras, mobile devices and tablets.

According to the above description of the present disclosure, the following 1st-8th specific embodiments are provided for further explanation.

1st Embodiment

Figure 2A:
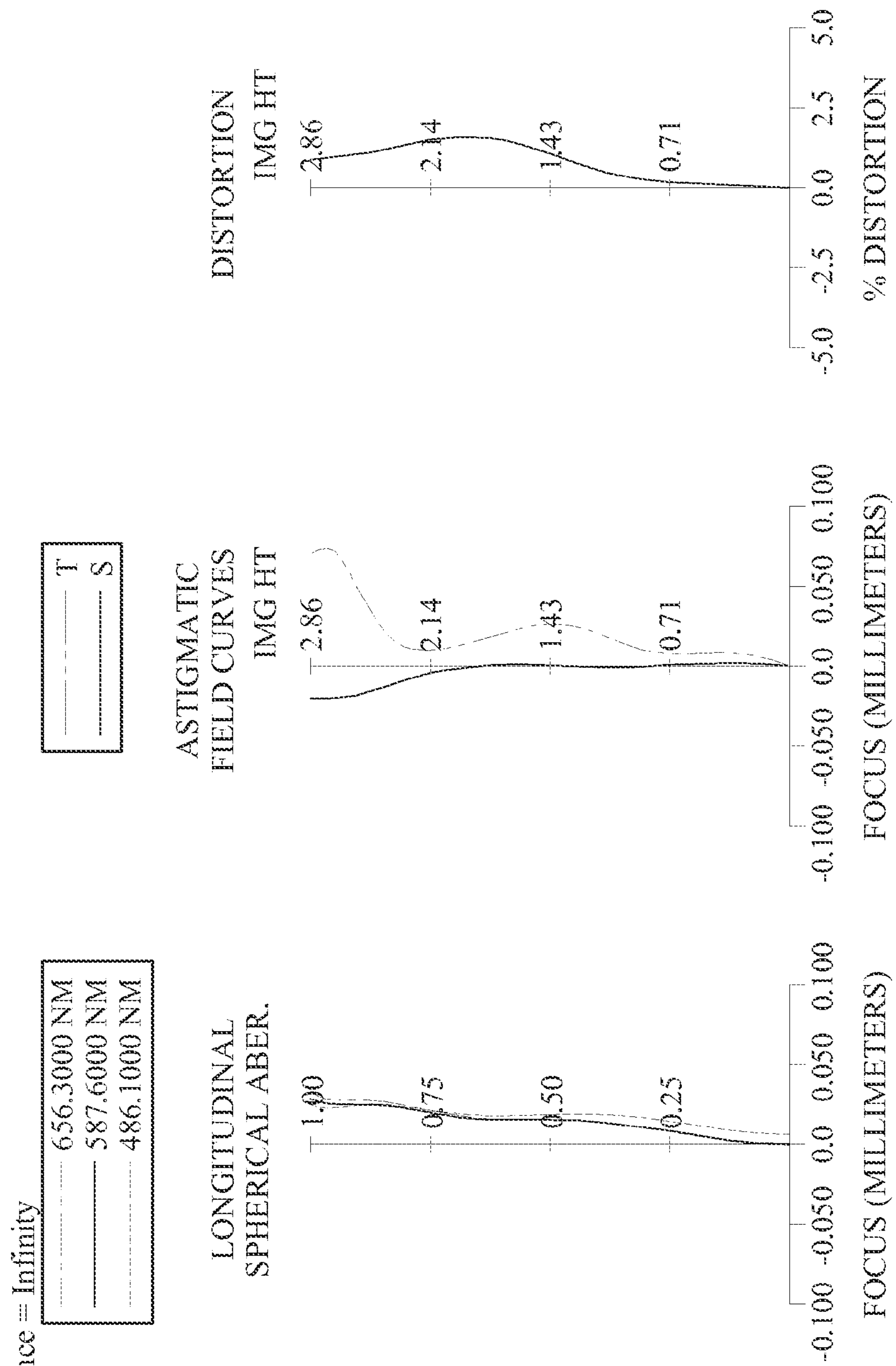
FIG. 2A shows spherical aberration curves, astigmatic field curves and a distortion curve of the focus adjusting optical lens assembly according to the 1st embodiment when the object is at infinity.
Figure 2B:
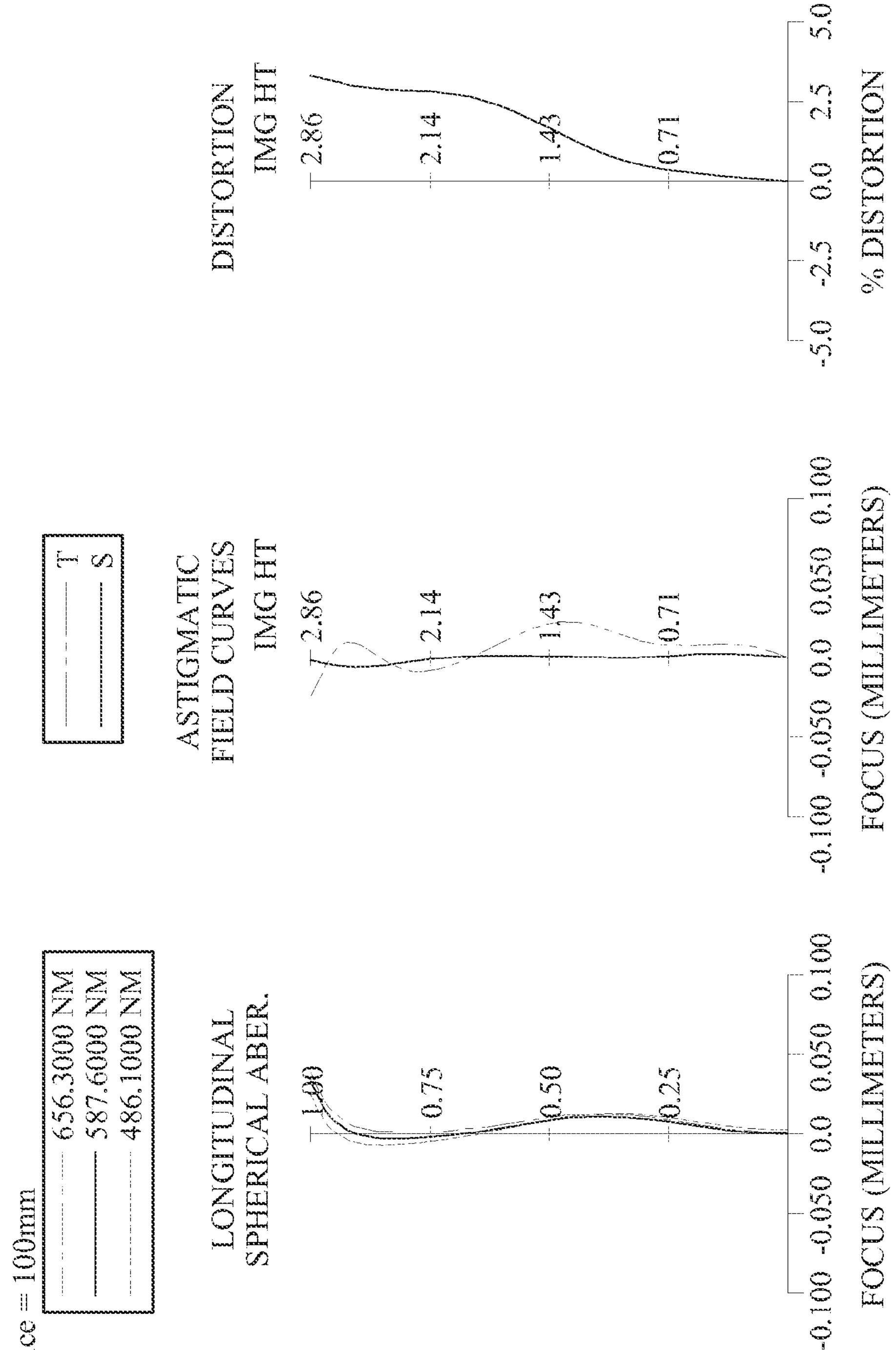
FIG. 2B shows spherical aberration curves, astigmatic field curves and a distortion curve of the focus adjusting optical lens assembly according to the 1st embodiment when the object is at a close distance.

FIG. 1 is a schematic view of a focus adjusting optical lens assembly according to the 1st embodiment of the present disclosure. FIG. 2A shows spherical aberration curves, astigmatic field curves and a distortion curve of the focus adjusting optical lens assembly according to the 1st embodiment when the object is at infinity (i.e. the object distance is infinity). FIG. 2B shows spherical aberration curves, astigmatic field curves and a distortion curve of the focus adjusting optical lens assembly according to the 1st embodiment when the object is at a close distance (i.e. the object distance is at 100 mm). In FIG. 1, the focus adjusting optical lens assembly comprises, in order from an object side to an image side, an aperture stop 100, a first lens element 110, a second lens element 120, a third lens element 130, a fourth lens element 140, a fifth lens element 150, an IR-cut filter 170 and an image plane 160. Moreover, the focus adjusting optical lens assembly has a total of five lens elements with refractive power.

The first lens element 110 with positive refractive power has a convex object-side surface 111 and a convex image-side surface 112, and is made of plastic material. The object-side surface 111 and the image-side surface 112 of the first lens element 110 are aspheric.

The second lens element 120 with negative refractive power has a convex object-side surface 121 and a concave image-side surface 122, and is made of plastic material. The object-side surface 121 and the image-side surface 122 of the second lens element 120 are aspheric.

The third lens element 130 with positive refractive power has a concave object-side surface 131 and a convex image-side surface 132, and is made of plastic material. The object-side surface 131 and the image-side surface 132 of the third lens element 130 are aspheric.

The fourth lens element 140 with negative refractive power has a concave object-side surface 141 and a convex image-side surface 142, and is made of plastic material. The object-side surface 141 and the image-side surface 142 of the fourth lens element 140 are aspheric.

The fifth lens element 150 with positive refractive power has a convex object-side surface 151 and a concave image-side surface 152 at a paraxial region, wherein the image-side surface 152 of the fifth lens element 150 changes from concave at the paraxial region to convex at a peripheral region. The fifth lens element 150 is made of plastic material, and the object-side surface 151 and the image-side surface 152 thereof are aspheric.

An IR-cut filter 170 is made of glass and located between the fifth lens element 150 and the image plane 160, and does not affect the focal length of the focus adjusting optical lens assembly.

When the focusing adjustment of the focus adjusting optical lens assembly is performed by moving the first lens element 110 along an optical axis; the second lens element 120, the third lens element 130, the fourth lens element 140, and the fifth lens element 150 are fixed with respect to an image plane 160.

The equation of the aspheric surface profiles of the aforementioned lens elements of the 1st embodiment is expressed as follows:

$$X(Y)=(Y^2/R)/(1+sqrt(1-(1+k)\times(Y/R)^2))+\sum_i (Ai)\times(Y^i)$$

wherein:

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius of the lens elements;

k is the conic coefficient; and

Ai is the i-th aspheric coefficient.

When the object is at infinity, it means that the object is at infinity. Furthermore, when the object is at 100 mm, it means that the object is at a close distance. In the focus adjusting optical lens assembly according to the 1st embodiment, when a focal length of the focus adjusting optical lens assembly focused on an object at infinity is Fi, a focal length of the focus adjusting optical lens assembly focused on an object at a close distance is Fm, half of the maximal field of view of the focus adjusting optical lens assembly focused on the object at infinity is HFOVi, half of the maximal field of view of the focus adjusting optical lens assembly focused on the object at a close distance is HFOVm, and an f-number of the focus adjusting optical lens assembly is Fno, these parameters have the following values: Fi=3.86 (mm); Fm=3.79 (mm); HFOVi=36.2 (deg.); HFOVm=34.7 (deg.); and Fno=2.40.

In the focus adjusting optical lens assembly according to the 1st embodiment, when the Abbe number of the first lens element 110 is V1, the Abbe number of the second lens element 120 is V2, and the Abbe number of the fourth lens element 140 is V4, the following relationship is satisfied: (V2+V4)/V1=0.83.

In the focus adjusting optical lens assembly according to the 1st embodiment, when a central thickness of the fourth lens element 140 is CT4, the following relationship is satisfied: CT4=0.315 (mm).

In the focus adjusting optical lens assembly according to the 1st embodiment, when the difference of an axial distance between the first lens element 110 and the second lens element 120 of the focus adjusting optical lens assembly focused on the object at a close distance and infinity is ΔT12, and a central thickness of the second lens element 120 is CT2, the following relationship is satisfied: |ΔT12|/CT2=0.260.

In the focus adjusting optical lens assembly according to the 1st embodiment, when the central thickness of the fourth lens element 140 is CT4, and a central thickness of the fifth lens element 150 is CT5, the following relationship is satisfied: CT4/CT5=0.257.

In the focus adjusting optical lens assembly according to the 1st embodiment, when a distance between the object-side surface 111 of the first lens element 110 and the image plane 160 of the focus adjusting optical lens assembly focused on the object at infinity is TLi, the following relationship is satisfied: TLi=4.871 (mm).

In the focus adjusting optical lens assembly according to the 1st embodiment, when the distance between the object-side surface 111 of the first lens element 110 and the image plane 160 of the focus adjusting optical lens assembly focused on the object at infinity is TLi, and a distance between the object-side surface 111 of the first lens element 110 and the image plane 160 of the focus adjusting optical lens assembly focused on the object at a close distance is TLm, the following relationship is satisfied: (|TLi−TLm|/TLi)×10=0.14.

In the focus adjusting optical lens assembly according to the 1st embodiment, when the focal length of the focus adjusting optical lens assembly focused on the object at infinity is Fi, and the focal length of the focus adjusting optical lens assembly focused on the object at a close distance is Fm, the following relationship is satisfied: Fi/Fm=1.02.

In the focus adjusting optical lens assembly according to the 1st embodiment, when the focal length of the focus adjusting optical lens assembly focused on the object at infinity is Fi, and a focal length of the third lens element 130 is f3, the following relationship is satisfied: Fi/f3=0.55.

In the focus adjusting optical lens assembly according to the 1st embodiment, when the focal length of the focus adjusting optical lens assembly focused on the object at infinity is Fi, and a focal length of the fourth lens element 140 is f4, the following relationship is satisfied: Fi/f4=−0.62.

In the focus adjusting optical lens assembly according to the 1st embodiment, when the focal length of the focus adjusting optical lens assembly focused on the object at infinity is Fi, and a focal length of the fifth lens element 150 is f5, the following relationship is satisfied: Fi/f5=0.22.

In the focus adjusting optical lens assembly according to the 1st embodiment, when the focal length of the focus adjusting optical lens assembly focused on the object at infinity is Fi, the focal length of the fourth lens element 140 is f4, and the focal length of the fifth lens element 150 is f5, the following relationship is satisfied: |Fi/f4|+|Fi/f5|=0.84.

In the focus adjusting optical lens assembly according to the 1st embodiment, when a distance between the object-side surface 111 of the first lens element 110 and the image-side surface 152 of the fifth lens element 150 of the focus adjusting optical lens assembly focused on the object at infinity is TDi, and a vertical distance between a maximum effective diameter position on the image-side surface 152 of the fifth lens element 150 and an optical axis is SD52, the following relationship is satisfied: TDi/SD52=1.50.

In the focus adjusting optical lens assembly according to the 1st embodiment, when an axial distance between the first lens element 110 and the second lens element 120 of the focus adjusting optical lens assembly focused on the object at infinity is T12i, and an axial distance between the first lens element 110 and the second lens element 120 of the focus adjusting optical lens assembly focused on the object at a close distance is T12m. Therefore, the difference of an axial distance between the first lens element 110 and the second lens element 120 of the focus adjusting optical lens assembly focused on the object at a close distance and infinity is ΔT12 which is T12i−T12m or T12m−T12i.

The detailed optical data of the 1st embodiment are shown in Table 1, and the aspheric surface data are shown in Table 2 below.

TABLE 1

| Embodiment 1<br>Object Distance = Infinity: Fi = 3.86 mm, Fno = 2.40, HFOVi = 36.2 deg. | | | | | | | |
|---|---|---|---|---|---|---|---|
| Surface # | | Curvature Radius | Thickness | Material | Index | Abbe # | Focal Length |
| 0 | Object | Plano | Infinity, 100 | | | | |
| 1 | Ape. Stop | Plano | −0.217 | | | | |
| 2 | Lens 1 | 1.540 ASP | 0.516 | Plastic | 1.544 | 55.9 | 2.74 |
| 3 | | −39.668 ASP | 0.070, 0.140 | | | | |
| 4 | Lens 2 | 11.194 ASP | 0.269 | Plastic | 1.640 | 23.3 | −4.91 |
| 5 | | 2.429 ASP | 0.495 | | | | |
| 6 | Lens 3 | −13.252 ASP | 0.361 | Plastic | 1.544 | 55.9 | 7.05 |
| 7 | | −3.005 ASP | 0.367 | | | | |
| 8 | Lens 4 | −0.920 ASP | 0.315 | Plastic | 1.640 | 23.3 | −6.27 |
| 9 | | −1.354 ASP | 0.146 | | | | |
| 10 | Lens 5 | 1.829 ASP | 1.228 | Plastic | 1.544 | 55.9 | 17.21 |
| 11 | | 1.735 ASP | 0.500 | | | | |
| 12 | IR-cut filter | Plano | 0.300 | Glass | 1.517 | 64.2 | — |
| 13 | | Plano | 0.304 | | | | |
| 14 | Image | Plano | — | | | | |

Note:
Reference wavelength (d-line) is 587.6 nm.
*Half of the effective diameter of the aperture stop at Surface 1 is 0.804 mm.
* Object Distance = 100 mm: surface 3 thickness = 0.140 mm, Fm = 3.79 mm

TABLE 2

| Aspheric Coefficients | | | | | |
|---|---|---|---|---|---|
| Surface # | 2 | 3 | 4 | 5 | 6 |
| k = | 2.1090E−01 | −2.3107E+00 | −1.9459E+01 | −1.8638E+01 | 4.7122E+00 |
| A4 = | 6.1286E−03 | 3.6888E−02 | −2.5771E−02 | 2.6405E−02 | −8.4029E−02 |
| A6 = | 2.1914E−02 | 1.2787E−02 | 6.4418E−02 | −2.8244E−02 | 2.2762E−03 |
| A8 = | −9.5335E−03 | 1.2596E−02 | −1.3882E−01 | 1.7996E−02 | −1.4597E−02 |
| A10 = | 1.0572E−02 | 6.0099E−02 | 8.2722E−02 | −3.9306E−02 | 1.6332E−02 |
| A12 = | 4.7303E−02 | −1.3761E−01 | 5.6559E−02 | 7.8427E−03 | 3.8470E−02 |
| A14 = | −7.5654E−03 | 1.7534E−01 | −7.2237E−02 | 1.5214E−02 | 2.5262E−02 |
| A16 = | — | — | — | — | −2.5253E−02 |
| Surface # | 7 | 8 | 9 | 10 | 11 |
| k = | 2.3574E+00 | −5.1124E+00 | −5.9235E−01 | −1.7058E+01 | −7.6384E+00 |
| A4 = | −3.4789E−02 | −8.8443E−02 | 8.0976E−02 | −1.2308E−01 | −4.8703E−02 |
| A6 = | −1.0038E−01 | −2.1963E−02 | −5.8155E−02 | 6.1399E−02 | 1.9099E−02 |
| A8 = | 5.0878E−02 | 8.2177E−02 | 4.2748E−02 | −3.2193E−02 | −7.7775E−03 |
| A10 = | −3.2766E−02 | −5.1079E−02 | 1.0903E−02 | 1.4550E−02 | 1.9844E−03 |
| A12 = | −5.8811E−02 | 2.0952E−02 | −5.7497E−03 | −3.8112E−03 | −3.2167E−04 |
| A14 = | 7.5069E−02 | 1.1909E−02 | −3.4241E−03 | 5.0728E−04 | 2.9699E−05 |
| A16 = | — | −1.2018E−02 | 1.1307E−03 | −2.7024E−05 | −1.1651E−06 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
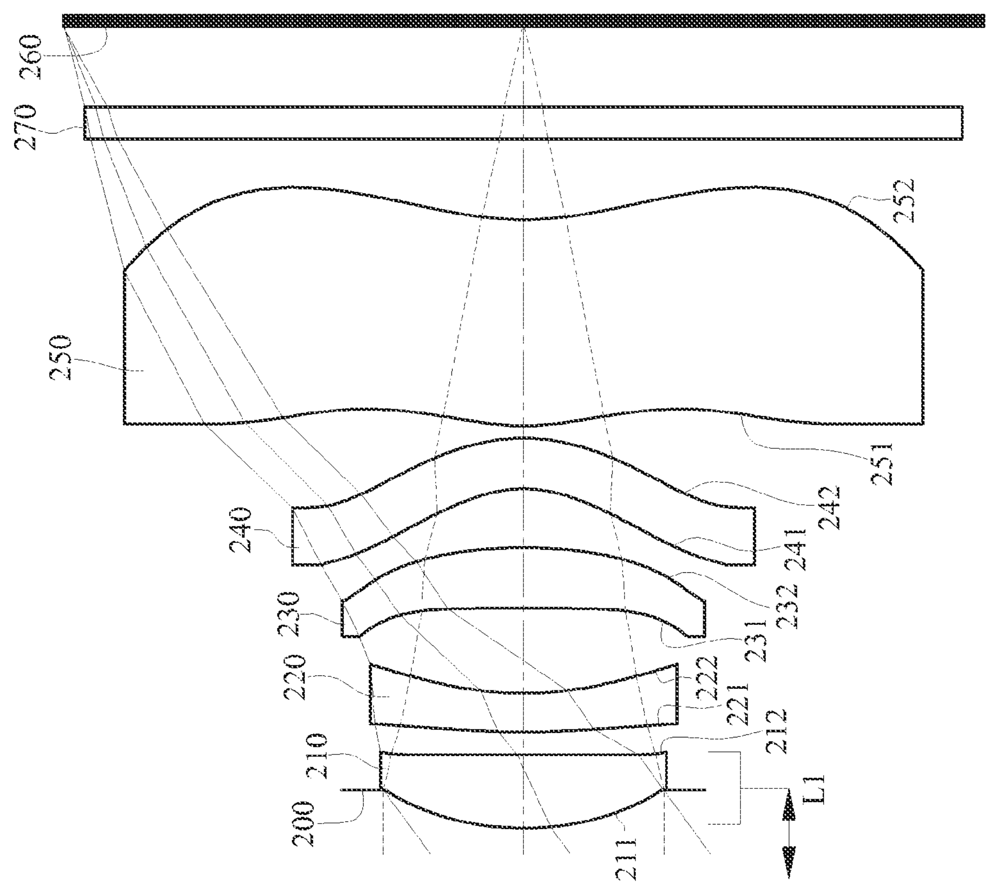
FIG. 3 is a schematic view of a focus adjusting optical lens assembly according to the 2nd embodiment of the present disclosure.
Figure 4A:
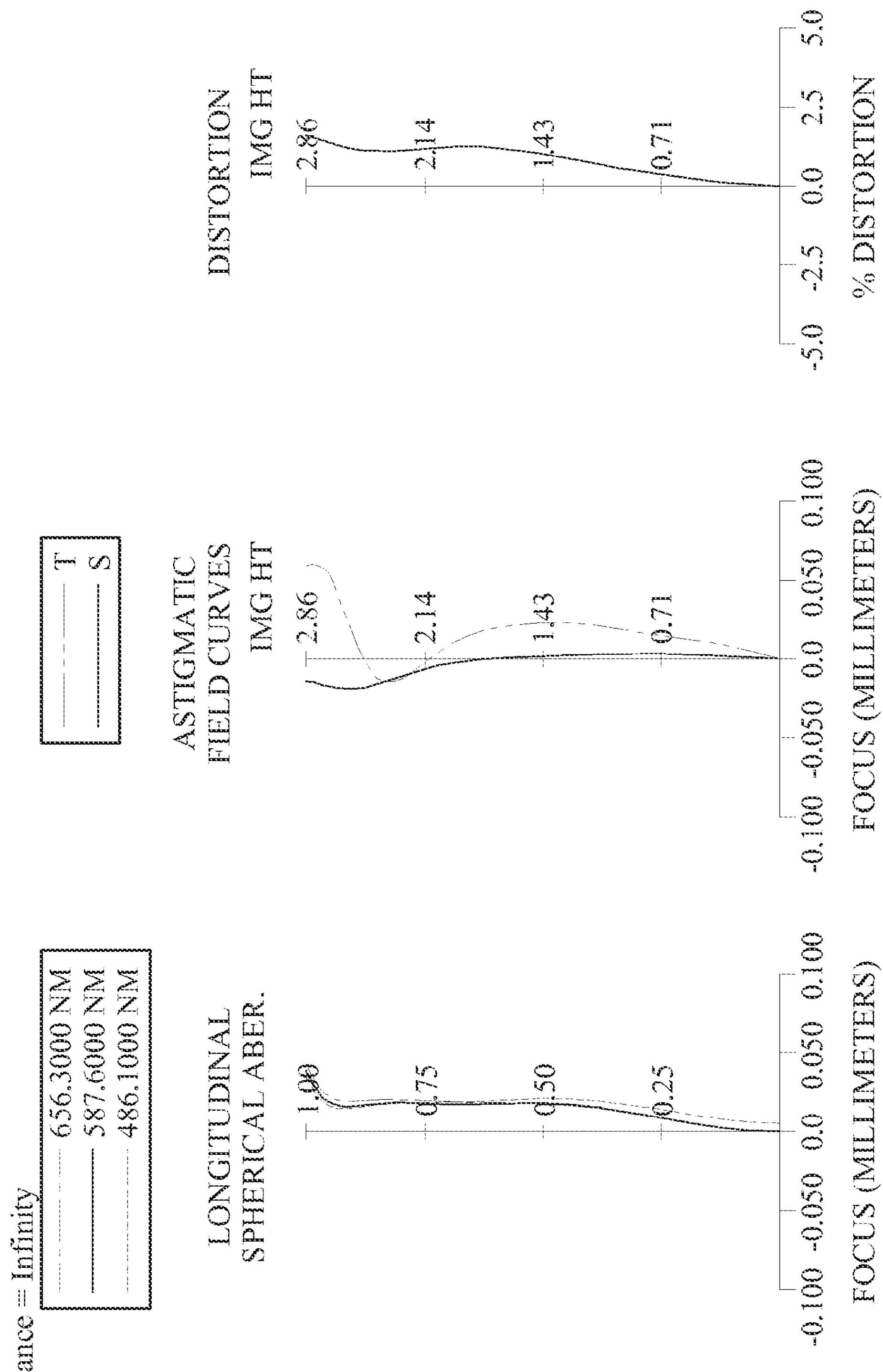
FIG. 4A shows spherical aberration curves, astigmatic field curves and a distortion curve of the focus adjusting optical lens assembly according to the 2nd embodiment when the object is at infinity.
Figure 4B:
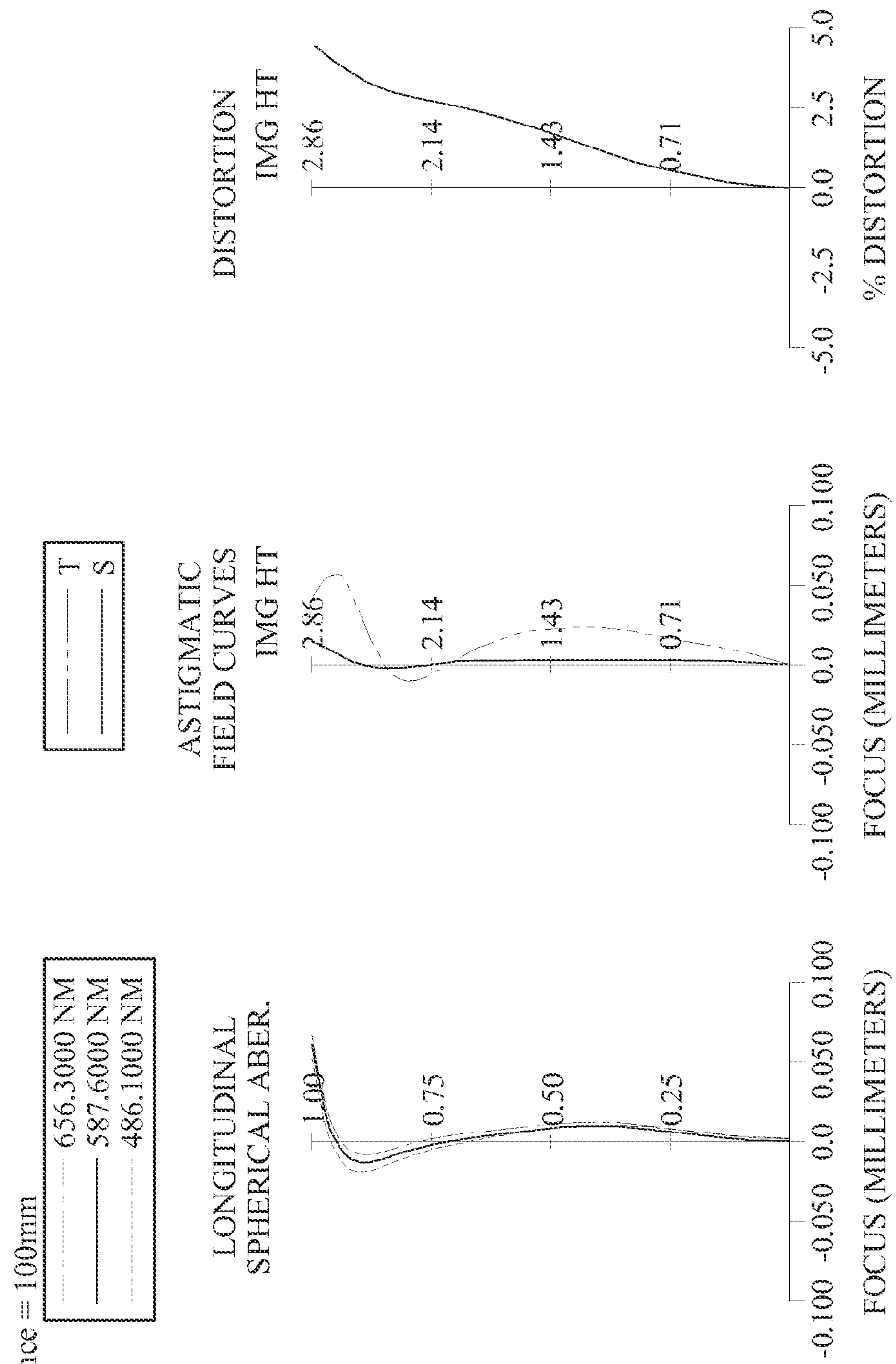
FIG. 4B shows spherical aberration curves, astigmatic field curves and a distortion curve of the focus adjusting optical lens assembly according to the 2nd embodiment when the object is at a close distance.

FIG. 3 is a schematic view of a focus adjusting optical lens assembly according to the 2nd embodiment of the present disclosure. FIG. 4A shows spherical aberration curves, astigmatic field curves and a distortion curve of the focus adjusting optical lens assembly according to the 2nd embodiment when the object is at infinity (i.e. the object distance is infinity). FIG. 4B shows spherical aberration curves, astigmatic field curves and a distortion curve of the focus adjusting optical lens assembly according to the 2nd embodiment when the object at a close distance (i.e. the object distance is at 100 mm). In FIG. 3, the focus adjusting optical lens assembly comprises, in order from an object side to an image side, an aperture stop 200, a first lens element 210, a second lens element 220, a third lens element 230, a fourth lens element 240, a fifth lens element 250, an IR-cut filter 270 and an image plane 260. Moreover, the focus adjusting optical lens assembly has a total of five lens elements with refractive power.

The first lens element 210 with positive refractive power has a convex object-side surface 211 and a convex image-side surface 212, and is made of plastic material. The object-side surface 211 and the image-side surface 212 of the first lens element 210 are aspheric.

The second lens element 220 with negative refractive power has a convex object-side surface 221 and a concave image-side surface 222, and is made of plastic material. The object-side surface 221 and the image-side surface 222 of the second lens element 220 are aspheric.

The third lens element 230 with positive refractive power has a convex object-side surface 231 and a convex image-side surface 232, and is made of plastic material. The object-side surface 231 and the image-side surface 232 of the third lens element 230 are aspheric.

The fourth lens element 240 with negative refractive power has a concave object-side surface 241 and a convex image-side surface 242, and is made of plastic material. The object-side surface 241 and the image-side surface 242 of the fourth lens element 240 are aspheric.

The fifth lens element 250 with positive refractive power has a convex object-side surface 251 and a concave image-side surface 252 at a paraxial region, wherein the image-side surface 252 of the fifth lens element 250 changes from concave at the paraxial region to convex at a peripheral region. The fifth lens element 250 is made of plastic material, and the object-side surface 251 and the image-side surface 252 thereof are aspheric.

An IR-cut filter 270 is made of glass and located between the fifth lens element 250 and the image plane 260, and does not affect the focal length of the focus adjusting optical lens assembly.

When the focusing adjustment of the focus adjusting optical lens assembly is performed by moving the first lens element 210 along an optical axis; the second lens element 220, the third lens element 230, the fourth lens element 240, and the fifth lens element 250 are fixed with respect to an image plane 260.

The detailed optical data of the 2nd embodiment are shown in Table 3 and the aspheric surface data are shown in Table 4 below.

TABLE 3

Embodiment 2
Object Distance = Infinity: Fi = 3.83 mm, Fno = 2.20, HFOVi = 36.2 deg.

| Surface # | | Curvature Radius | Thickness | Material | Index | Abbe # | Focal Length |
|---|---|---|---|---|---|---|---|
| 0 | Object | Plano | Infinity, 100 | | | | |
| 1 | Ape. Stop | Plano | −0.239 | | | | |
| 2 | Lens 1 | 1.760 ASP | 0.458 | Plastic | 1.544 | 55.9 | 3.10 |
| 3 | | −36.268 ASP | 0.140, 0.229 | | | | |
| 4 | Lens 2 | 4.796 ASP | 0.240 | Plastic | 1.639 | 23.5 | −5.26 |
| 5 | | 1.938 ASP | 0.530 | | | | |
| 6 | Lens 3 | 68.766 ASP | 0.376 | Plastic | 1.544 | 55.9 | 5.61 |
| 7 | | −3.188 ASP | 0.367 | | | | |
| 8 | Lens 4 | −0.759 ASP | 0.315 | Plastic | 1.639 | 23.5 | −4.92 |
| 9 | | −1.163 ASP | 0.079 | | | | |
| 10 | Lens 5 | 1.595 ASP | 1.280 | Plastic | 1.535 | 55.7 | 7.52 |
| 11 | | 1.903 ASP | 0.500 | | | | |
| 12 | IR-cut filter | Plano | 0.200 | Glass | 1.517 | 64.2 | — |
| 13 | | Plano | 0.502 | | | | |
| 14 | Image | Plano | — | | | | |

Note:
Reference wavelength (d-line) is 587.6 nm.
*Half of the effective diameter of the aperture stop at Surface 1 is 0.871 mm.
* Object Distance = 100 mm: surface 3 thickness = 0.229 mm, Fm = 3.79 mm

TABLE 4

Aspheric Coefficients

| Surface # | 2 | 3 | 4 | 5 | 6 |
|---|---|---|---|---|---|
| k = | −4.2557E−02 | 4.7449E+00 | −2.0000E+01 | −1.1665E+01 | 5.0000E+00 |
| A4 = | 5.6758E−03 | 1.2952E−02 | −9.2692E−02 | 5.3773E−02 | −1.2753E−01 |
| A6 = | 2.4064E−02 | 3.7716E−02 | 1.4901E−01 | −4.4600E−02 | 2.7797E−02 |
| A8 = | −1.2917E−02 | −2.2098E−02 | −1.5436E−01 | 3.3677E−02 | −1.1369E−02 |
| A10 = | −1.5246E−02 | −1.2012E−02 | −1.6310E−02 | −5.4946E−02 | −1.0390E−01 |
| A12 = | 4.7196E−02 | 2.2866E−02 | 1.7992E−01 | 5.0035E−02 | −1.1988E−02 |
| A14 = | −4.0758E−03 | 3.6807E−02 | −9.7523E−02 | −1.7536E−02 | 5.0838E−02 |
| A16 = | — | — | — | — | 7.7264E−03 |

| Surface # | 7 | 8 | 9 | 10 | 11 |
|---|---|---|---|---|---|
| k = | 2.4887E+00 | −3.8815E+00 | −8.5579E−01 | −1.3578E+01 | −6.7306E+00 |
| A4 = | −6.0481E−02 | −7.2667E−02 | 1.0497E−01 | −1.1744E−01 | −5.7719E−02 |
| A6 = | −2.8707E−02 | 1.8276E−02 | −4.5193E−02 | 5.7875E−02 | 2.0607E−02 |
| A8 = | 5.9960E−02 | 1.0344E−01 | 3.5025E−02 | −3.1458E−02 | −7.8693E−03 |
| A10 = | −4.1438E−02 | −6.8225E−02 | 9.9932E−03 | 1.4595E−02 | 1.9854E−03 |
| A12 = | −6.5159E−02 | 6.7758E−03 | −5.0485E−03 | −3.8311E−03 | −3.2054E−04 |
| A14 = | 5.7239E−02 | 1.0229E−02 | −3.0592E−03 | 5.0433E−04 | 2.9599E−05 |
| A16 = | — | −4.4533E−03 | 9.9586E−04 | −2.6341E−05 | −1.1699E−06 |

In the focus adjusting optical lens assembly according to the 2nd embodiment, the definitions of these parameters shown in the following table are the same as those stated in the 1st embodiment with corresponding values for the 2nd embodiment.

| | | | |
|---|---|---|---|
| Fi [mm] | 3.83 | TLi [mm] | 4.987 |
| Fm [mm] | 3.79 | (\|TLi − TLm\|/TLi) × 10 | 0.18 |
| HFOVi [deg.] | 36.2 | Fi/Fm | 1.01 |
| HFOVm [deg.] | 34.5 | Fi/f3 | 0.68 |
| Fno | 2.20 | Fi/f4 | −0.78 |
| (V2 + V4)/V1 | 0.84 | Fi/f5 | 0.51 |
| CT4 [mm] | 0.315 | \|Fi/f4\| + \|Fi/f5\| | 1.29 |
| \|ΔT12\|/CT2 | 0.371 | TDi/SD52 | 1.52 |
| CT4/CT5 | 0.246 | | |

3rd Embodiment

Figure 5:
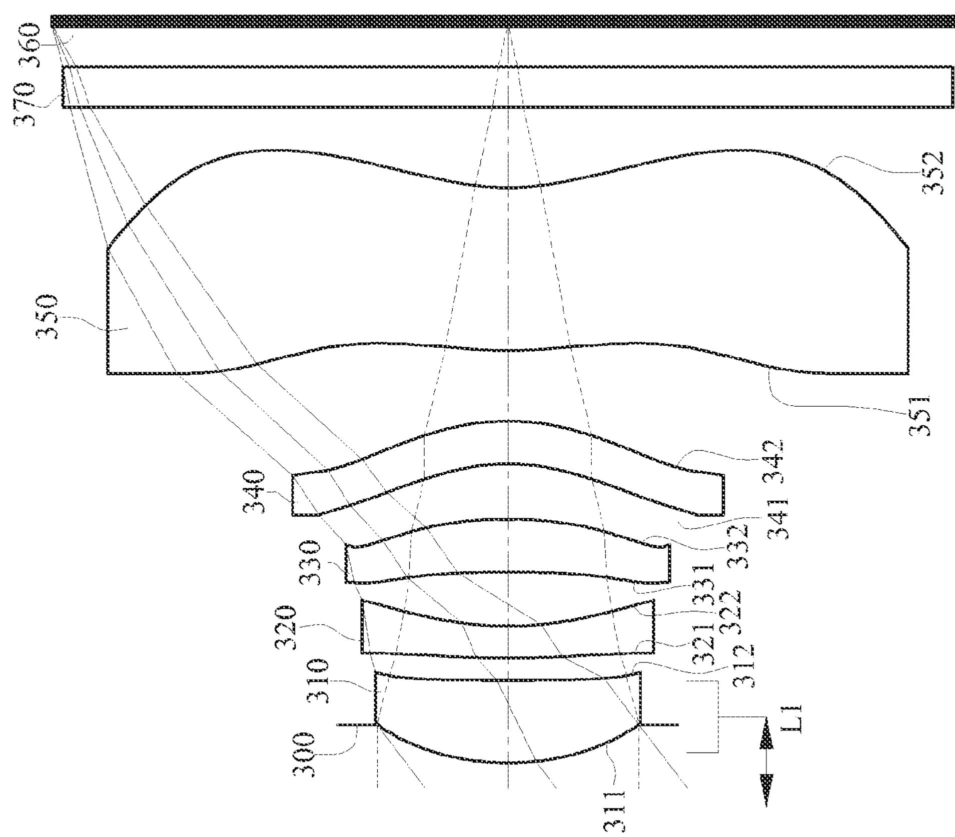
FIG. 5 is a schematic view of a focus adjusting optical lens assembly according to the 3rd embodiment of the present disclosure.
Figure 6A:
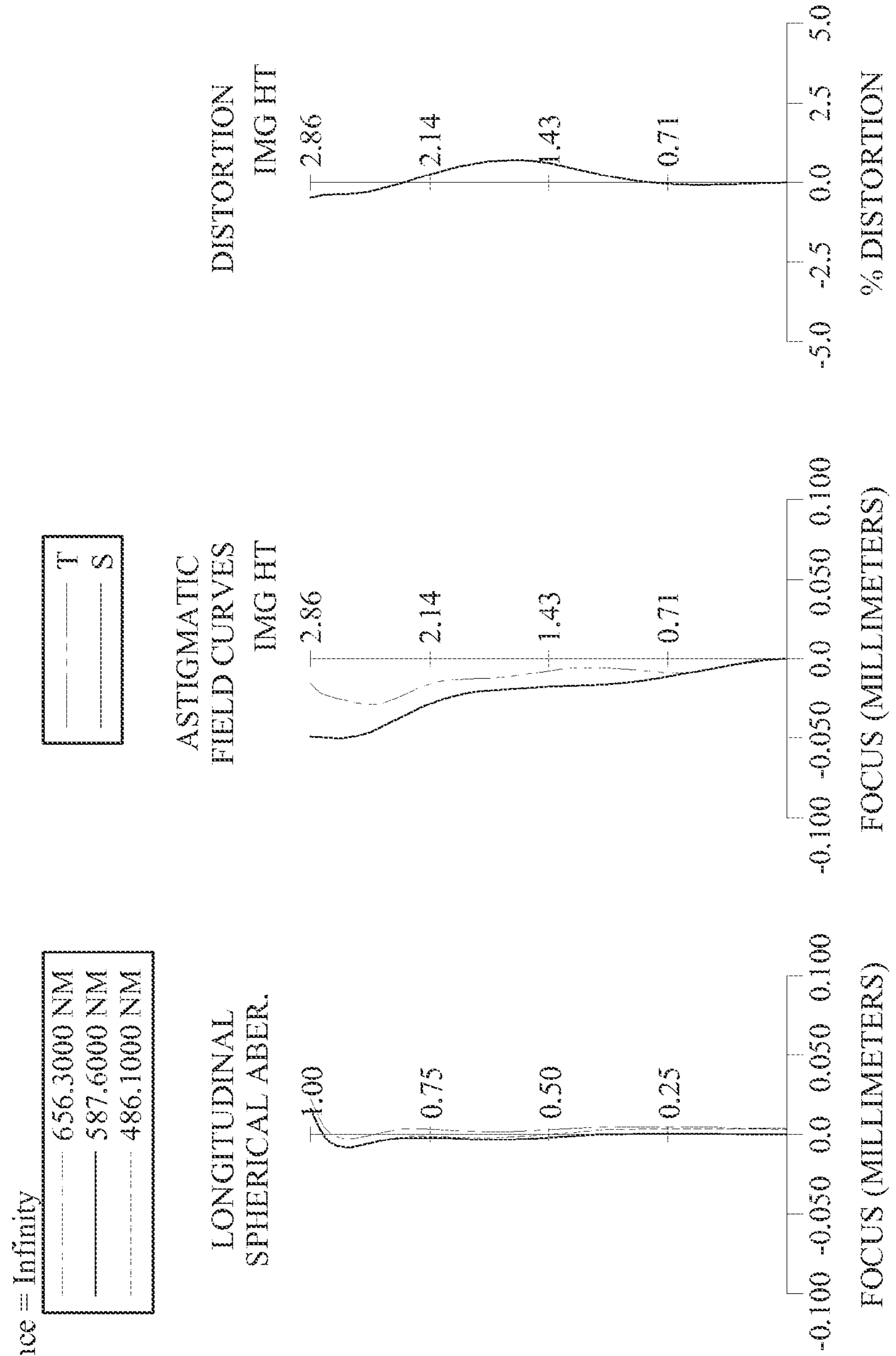
FIG. 6A shows spherical aberration curves, astigmatic field curves and a distortion curve of the focus adjusting optical lens assembly according to the 3rd embodiment when the object is at infinity.
Figure 6B:
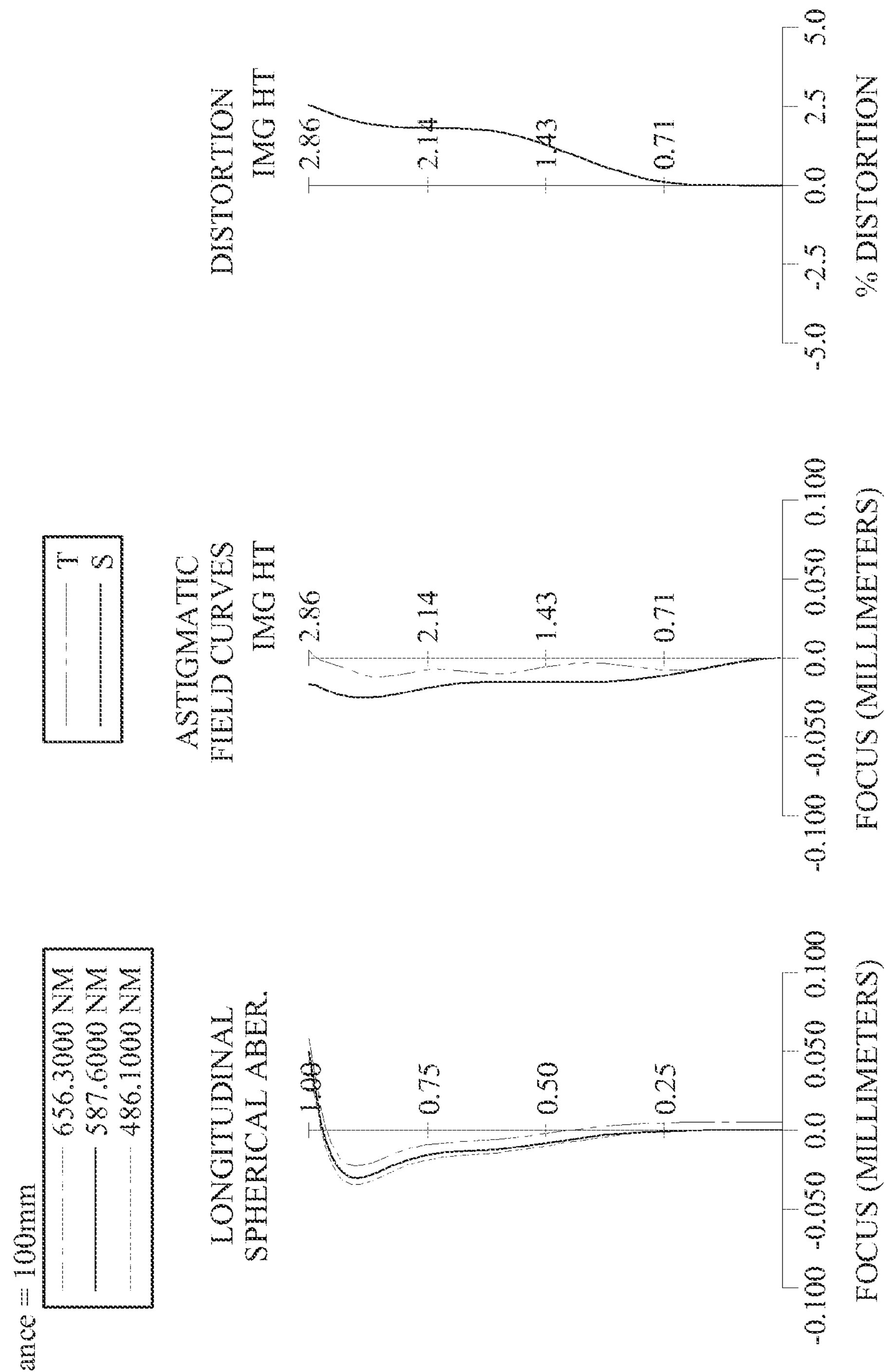
FIG. 6B shows spherical aberration curves, astigmatic field curves and a distortion curve of the focus adjusting optical lens assembly according to the 3rd embodiment when the object is at a close distance.

FIG. 5 is a schematic view of a focus adjusting optical lens assembly according to the 3rd embodiment of the present disclosure. FIG. 6A shows spherical aberration curves, astigmatic field curves and a distortion curve of the focus adjusting optical lens assembly according to the 3rd embodiment when the object is at infinity (i.e. the object distance is infinity). FIG. 6B shows spherical aberration curves, astigmatic field curves and a distortion curve of the focus adjusting optical lens assembly according to the 3rd embodiment when the object is at a close distance; (i.e., the object distance is 100 mm). In FIG. 5, the focus adjusting optical lens assembly comprises, in order from an object side to an image side, an aperture stop 300, a first lens element 310, a second lens element 320, a third lens element 330, a fourth lens element 340, a fifth lens element 350, an IR-cut filter 370 and an image plane 360. Moreover, the focus adjusting optical lens assembly has a total of five lens elements with refractive power.

The first lens element 310 with positive refractive power has a convex object-side surface 311 and a concave image-side surface 312, and is made of plastic material. The object-side surface 311 and the image-side surface 312 of the first lens element 310 are aspheric.

The second lens element 320 with negative refractive power has a convex object-side surface 321 and a concave image-side surface 322, and is made of plastic material. The object-side surface 321 and the image-side surface 322 of the second lens element 320 are aspheric.

The third lens element 330 with positive refractive power has a concave object-side surface 331 and a convex image-side surface 332, and is made of plastic material. The object-side surface 331 and the image-side surface 332 of the third lens element 330 are aspheric.

The fourth lens element 340 with negative refractive power has a concave object-side surface 341 and a convex image-side surface 342, and is made of plastic material. The object-side surface 341 and the image-side surface 342 of the fourth lens element 340 are aspheric.

The fifth lens element 350 with negative refractive power has a convex object-side surface 351 and a concave image-side surface 352 at a paraxial region, wherein the image-side surface 352 of the fifth lens element 350 changes from concave at the paraxial region to convex at a peripheral region. The fifth lens element 350 is made of plastic material, and the object-side surface 351 and the image-side surface 352 thereof are aspheric.

An IR-cut filter 370 is made of glass and located between the fifth lens element 350 and the image plane 360, and does not affect the focal length of the focus adjusting optical lens assembly.

When the focusing adjustment of the focus adjusting optical lens assembly is performed by moving the first lens element 310 along an optical axis; the second lens element 320, the third lens element 330, the fourth lens element 340, and the fifth lens element 350 are fixed with respect to an image plane 360.

The detailed optical data of the 3rd embodiment are shown in Table 5, and the aspheric surface data are shown in Table 6 below.

TABLE 5

| Embodiment 3<br>Object Distance = Infinity: Fi = 3.78 mm, Fno = 2.30, HFOVi = 37.2 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity, 100 | | | | |
| 1 | Ape. Stop | Plano | | −0.240 | | | | |
| 2 | Lens 1 | 1.614 | ASP | 0.519 | Plastic | 1.570 | 58.5 | 2.97 |
| 3 | | 30.249 | ASP | 0.139, 0.223 | | | | |
| 4 | Lens 2 | 5.495 | ASP | 0.202 | Plastic | 1.650 | 21.4 | −4.98 |
| 5 | | 2.007 | ASP | 0.339 | | | | |
| 6 | Lens 3 | −9.791 | ASP | 0.333 | Plastic | 1.544 | 55.9 | 6.17 |
| 7 | | −2.530 | ASP | 0.346 | | | | |
| 8 | Lens 4 | −1.277 | ASP | 0.269 | Plastic | 1.633 | 23.4 | −66.64 |
| 9 | | −1.425 | ASP | 0.443 | | | | |
| 10 | Lens 5 | 2.989 | ASP | 1.024 | Plastic | 1.535 | 55.7 | −8.96 |
| 11 | | 1.621 | ASP | 0.504 | | | | |
| 12 | IR-cut filter | Plano | | 0.252 | Glass | 1.517 | 64.2 | — |
| 13 | | Plano | | 0.252 | | | | |
| 14 | Image | Plano | | — | | | | |

Note:

Reference wavelength (d-line) is 587.6 nm.

*Half of the diameter of the aperture stop at Surface 1 is 0.822 mm.

* Object Distance = 100 mm: surface 3 thickness = 0.223 mm, Fm = 3.71 mm

TABLE 6

| Aspheric Coefficients | | | | | |
|---|---|---|---|---|---|
| Surface # | 2 | 3 | 4 | 5 | 6 |
| k = | 4.1450E−02 | −1.9925E+01 | −2.0000E+01 | −1.4212E+01 | −8.4183E+00 |
| A4 = | 9.1717E−03 | 3.3739E−02 | −9.7748E−02 | 7.1517E−02 | −1.2737E−01 |
| A6 = | 3.9483E−02 | 4.2763E−02 | 1.6956E−01 | −4.6902E−02 | 6.5028E−02 |
| A8 = | −2.6251E−02 | 1.4659E−04 | −1.9270E−01 | 3.3843E−02 | 1.4664E−02 |
| A10 = | −1.8696E−02 | 6.4530E−02 | −1.9580E−02 | −7.8460E−02 | −2.5205E−02 |
| A12 = | 1.4583E−01 | −1.4413E−01 | 1.7879E−01 | 2.7071E−02 | 6.4264E−02 |
| A14 = | −6.8768E−02 | 2.3419E−01 | −8.7179E−02 | 9.3205E−03 | 7.9629E−02 |
| A16 = | — | — | — | — | −7.7349E−02 |
| Surface # | 7 | 8 | 9 | 10 | 11 |
| k = | −2.8301E−01 | −5.3548E+00 | −7.5857E−01 | −2.0000E+01 | −6.6865E+00 |
| A4 = | −4.7619E−02 | −3.5422E−02 | 8.8832E−02 | −1.2295E−01 | −5.4622E−02 |
| A6 = | −2.5120E−02 | 2.4880E−03 | −3.1031E−02 | 5.7716E−02 | 1.9886E−02 |
| A8 = | 9.2449E−02 | 9.3693E−02 | 3.2989E−02 | −3.1081E−02 | −7.9631E−03 |
| A10 = | −7.9948E−03 | −6.9126E−02 | 7.1641E−03 | 1.4555E−02 | 1.9944E−03 |
| A12 = | −4.2627E−02 | 7.9999E−03 | −5.4652E−03 | −3.8192E−03 | −3.1958E−04 |
| A14 = | 6.7561E−02 | 9.9292E−03 | −2.9946E−03 | 5.0069E−04 | 2.9154E−05 |
| A16 = | — | −4.4640E−03 | 9.9135E−04 | −2.6013E−05 | −1.1062E−06 |

In the focus adjusting optical lens assembly according to the 3rd embodiment, the definitions of these parameters shown in the following table are the same as those stated in the 1st embodiment with corresponding values for the 3rd embodiment.

| | | | |
|---|---|---|---|
| Fi [mm] | 3.78 | TLi [mm] | 4.622 |
| Fm [mm] | 3.71 | (\|TLi − TLm\|/TLi) × 10 | 0.18 |
| HFOVi [deg.] | 37.2 | Fi/Fm | 1.02 |
| HFOVm [deg.] | 35.5 | Fi/f3 | 0.61 |
| Fno | 2.30 | Fi/f4 | −0.06 |
| (V2 + V4)/V1 | 0.77 | Fi/f5 | −0.42 |
| CT4 [mm] | 0.269 | \|Fi/f4\| + \|Fi/f5\| | 0.48 |
| \|ΔT12\|/CT2 | 0.465 | TDi/SD52 | 1.44 |
| CT4/CT5 | 0.263 | | |

4th Embodiment

Figure 7:
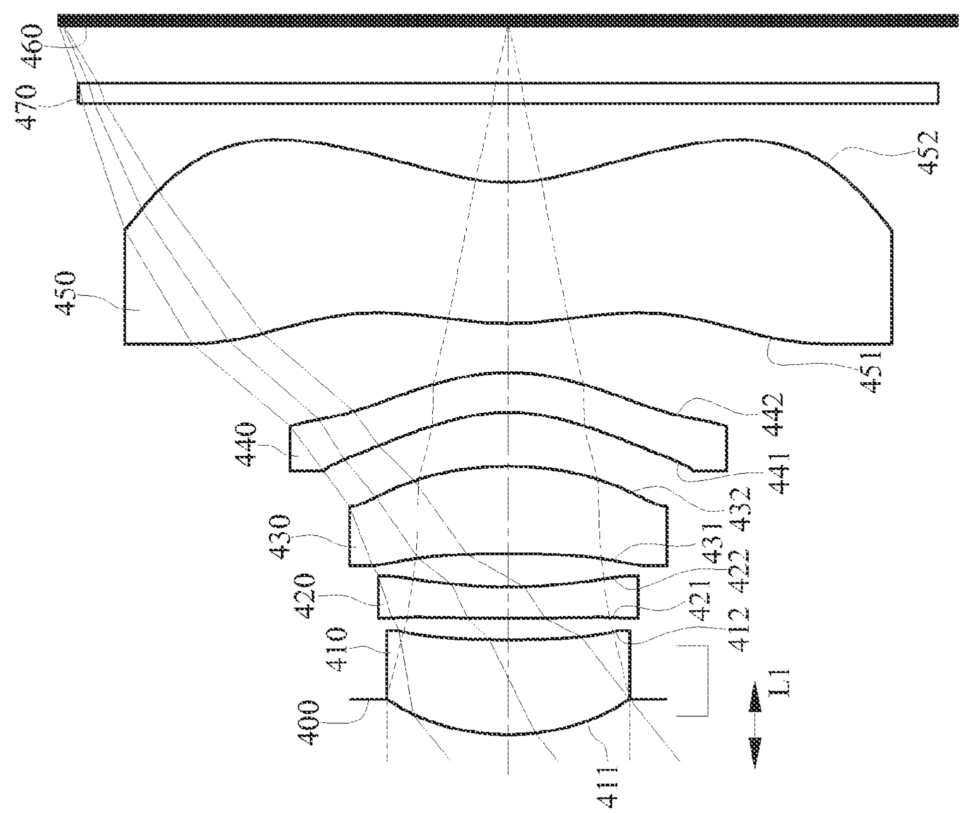
FIG. 7 is a schematic view of a focus adjusting optical lens assembly according to the 4th embodiment of the present disclosure.
Figure 8A:
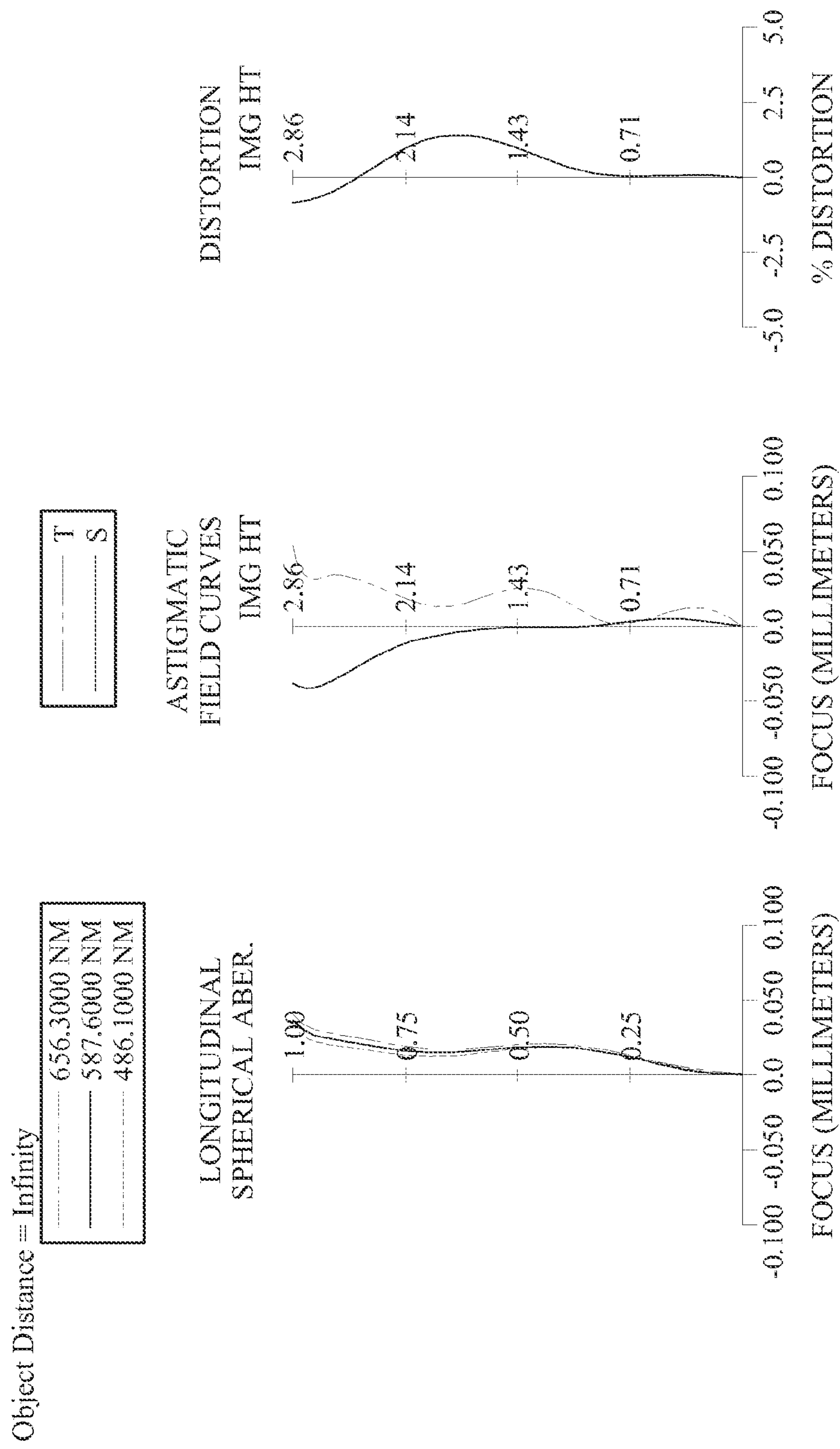
FIG. 8A shows spherical aberration curves, astigmatic field curves and a distortion curve of the focus adjusting optical lens assembly according to the 4th embodiment when the object is at infinity.
Figure 8B:
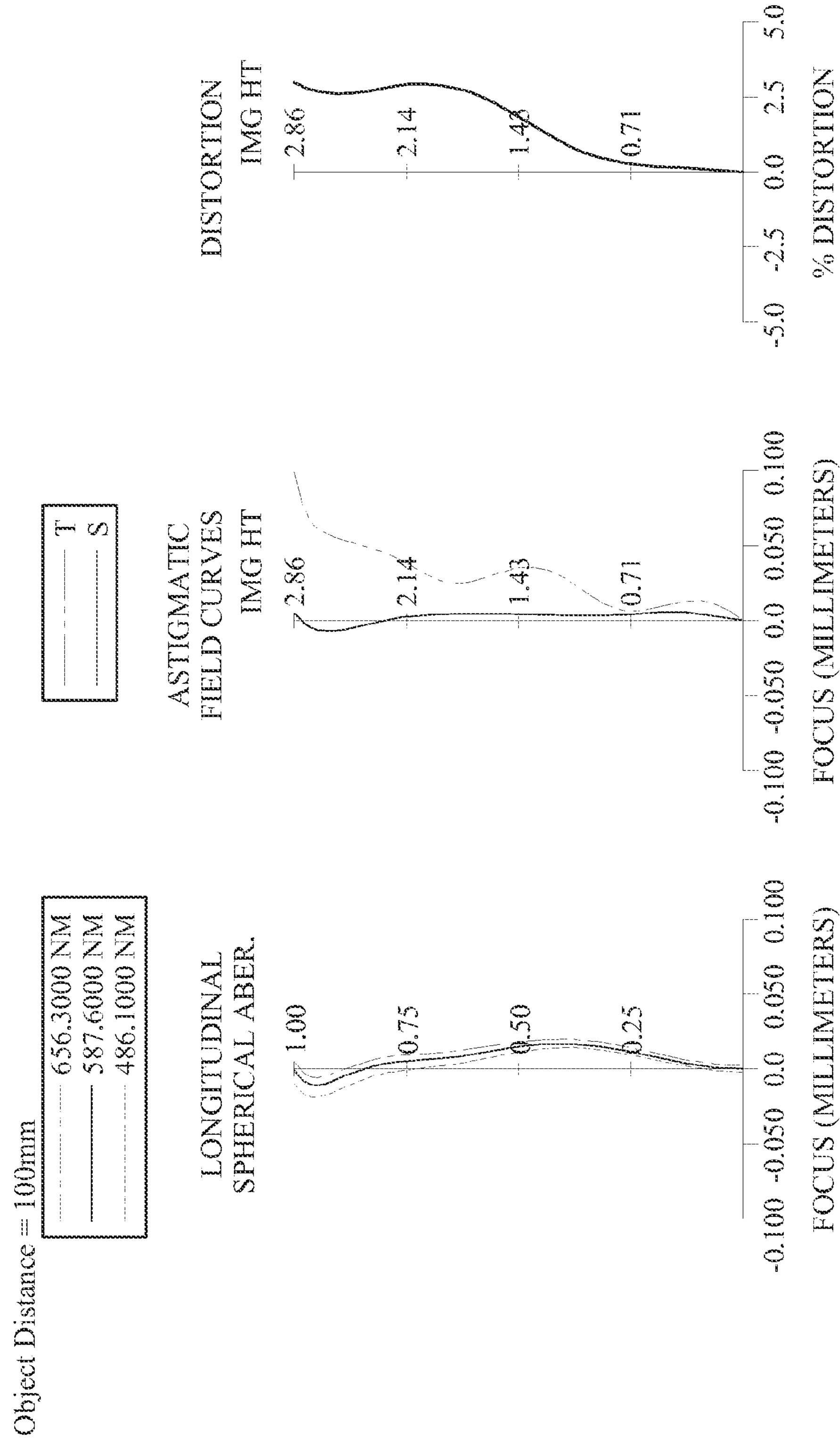
FIG. 8B shows spherical aberration curves, astigmatic field curves and a distortion curve of the focus adjusting optical lens assembly according to the 4th embodiment when the object is at a close distance.

FIG. 7 is a schematic view of a focus adjusting optical lens assembly according to the 4th embodiment of the present disclosure. FIG. 8A shows spherical aberration curves, astigmatic field curves and a distortion curve of the focus adjusting optical lens assembly according to the 4th embodiment when the object is at infinity (i.e. the object distance is infinity). FIG. 8B shows spherical aberration curves, astigmatic field curves and a distortion curve of the focus adjusting optical lens assembly according to the 4th embodiment when the object is at a close distance (i.e. the object distance is 100 mm). In FIG. 7, the focus adjusting optical lens assembly comprises, in order from an object side to an image side, an aperture stop 400, a first lens element 410, a second lens element 420, a third lens element 430, a fourth lens element 440, a fifth lens element 450, an IR-cut filter 470 and an image plane 460. Moreover, the focus adjusting optical lens assembly has a total of five lens elements with refractive power.

The first lens element 410 with positive refractive power has a convex object-side surface 411 and a concave image-side surface 412, and is made of glass material. The object-side surface 411 and the image-side surface 412 of the first lens element 410 are aspheric.

The second lens element 420 with negative refractive power has a convex object-side surface 421 and a concave image-side surface 422, and is made of plastic material. The object-side surface 421 and the image-side surface 422 of the second lens element 420 are aspheric.

The third lens element 430 with positive refractive power has a concave object-side surface 431 and a convex image-side surface 432, and is made of plastic material. The object-side surface 431 and the image-side surface 432 of the third lens element 430 are aspheric.

The fourth lens element 440 with negative refractive power has a concave object-side surface 441 and a convex image-side surface 442, and is made of plastic material. The object-side surface 441 and the image-side surface 442 of the fourth lens element 440 are aspheric.

The fifth lens element 450 with negative refractive power has a convex object-side surface 451 and a concave image-side surface 452 at a paraxial region, wherein the image-side surface 452 of the fifth lens element 450 changes from concave at the paraxial region to convex at a peripheral region. The fifth lens element 450 is made of plastic material, and the object-side surface 451 and the image-side surface 452 thereof are aspheric.

An IR-cut filter 470 is made of glass and located between the fifth lens element 450 and the image plane 460, and does not affect the focal length of the focus adjusting optical lens assembly.

When the focusing adjustment of the focus adjusting optical lens assembly is performed by moving the first lens element 410 along an optical axis; the second lens element 420, the third lens element 430, the fourth lens element 440, and the fifth lens element 450 are fixed with respect to an image plane 460.

The detailed optical data of the 4th embodiment are shown in Table 7, and the aspheric surface data are shown in Table 8 below.

TABLE 7

| Embodiment 4<br>Object Distance = Infinity: Fi = 3.59 mm, Fno = 2.30, HFOVi = 38.7 deg. | | | | | | | |
|---|---|---|---|---|---|---|---|
| Surface # | | Curvature Radius | Thickness | Material | Index | Abbe # | Focal Length |
| 0 | Object | Plano | Infinity, 100 | | | | |
| 1 | Ape. Stop | Plano | −0.227 | | | | |
| 2 | Lens 1 | 1.540 ASP | 0.610 | Glass | 1.569 | 71.3 | 3.24 |
| 3 | | 7.955 ASP | 0.136, 0.238 | | | | |
| 4 | Lens 2 | 15.323 ASP | 0.200 | Plastic | 1.640 | 23.3 | −6.27 |
| 5 | | 3.163 ASP | 0.216 | | | | |
| 6 | Lens 3 | −8.981 ASP | 0.560 | Plastic | 1.544 | 55.9 | 5.15 |
| 7 | | −2.183 ASP | 0.347 | | | | |
| 8 | Lens 4 | −1.165 ASP | 0.255 | Plastic | 1.640 | 23.3 | −15.38 |
| 9 | | −1.434 ASP | 0.316 | | | | |
| 10 | Lens 5 | 1.903 ASP | 0.906 | Plastic | 1.535 | 55.7 | −13.07 |
| 11 | | 1.247 ASP | 0.505 | | | | |
| 12 | IR-cut filter | Plano | 0.132 | Glass | 1.517 | 64.2 | — |
| 13 | | Plano | 0.364 | | | | |
| 14 | Image | Plano | — | | | | |

Note:
Reference wavelength (d-line) is 587.6 nm.
Half of the effective diameter of the aperture stop at Surface 1 is 0.780 mm.
*Half of the effective diameter at Surface 11 is 2.460 mm.
* Object Distance = 100 mm: surface 3 thickness = 0.238 mm, Fm = 3.54 mm

TABLE 8

| Aspheric Coefficients | | | | | |
|---|---|---|---|---|---|
| Surface # | 2 | 3 | 4 | 5 | 6 |
| k = | 2.0473E−01 | 4.9654E+00 | 4.9833E+00 | −2.0000E+01 | 2.5019E+00 |
| A4 = | 6.6439E−03 | 5.5950E−02 | −4.3808E−02 | 3.6539E−02 | −1.0269E−01 |
| A6 = | 6.0936E−02 | 7.0061E−02 | 9.4036E−02 | −4.7606E−02 | 1.5850E−02 |
| A8 = | −3.0683E−02 | 3.5136E−02 | −2.6985E−01 | 1.3417E−02 | −2.1777E−02 |
| A10 = | −3.9051E−02 | 6.6569E−02 | 7.6046E−02 | −1.5432E−01 | 7.6374E−03 |
| A12 = | 1.7763E−01 | −3.4829E−01 | 1.7438E−01 | 3.9487E−02 | 1.2073E−01 |
| A14 = | −8.5440E−02 | 5.5254E−01 | −2.6182E−01 | 3.6888E−02 | 8.0551E−02 |
| A16 = | — | — | — | — | −1.1016E−01 |
| Surface # | 7 | 8 | 9 | 10 | 11 |
| k = | −6.8454E−01 | −6.8627E+00 | −9.6014E−01 | −2.0000E+01 | −6.8196E+00 |
| A4 = | −3.6305E−02 | −5.8966E−02 | 1.0189E−01 | −1.2872E−01 | −5.6065E−02 |
| A6 = | −1.0663E−01 | 2.6908E−03 | −2.2327E−02 | 5.8387E−02 | 2.0758E−02 |
| A8 = | 9.9538E−02 | 8.7552E−02 | 2.1731E−02 | −3.0434E−02 | −7.9259E−03 |
| A10 = | 6.2588E−03 | −7.0068E−02 | 4.4551E−03 | 1.4257E−02 | 1.9354E−03 |
| A12 = | −4.5496E−02 | 1.2392E−02 | −5.2455E−03 | −3.7375E−03 | −3.1294E−04 |
| A14 = | 6.0097E−02 | 1.4184E−02 | −2.4647E−03 | 4.8392E−04 | 2.8274E−05 |
| A16 = | — | −9.2674E−03 | 1.1264E−03 | −2.4472E−05 | −9.9710E−07 |

In the focus adjusting optical lens assembly according to the 4th embodiment, the definitions of these parameters shown in the following table are the same as those stated in the 1st embodiment with corresponding values for the 4th embodiment.

| | | | |
|---|---|---|---|
| Fi [mm] | 3.59 | TLi [mm] | 4.547 |
| Fm [mm] | 3.54 | (\|TLi − TLm\|/TLi) × 10 | 0.22 |
| HFOVi [deg.] | 38.7 | Fi/Fm | 1.01 |
| HFOVm [deg.] | 36.7 | Fi/f3 | 0.70 |
| Fno | 2.30 | Fi/f4 | −0.23 |
| (V2 + V4)/V1 | 0.65 | Fi/f5 | −0.28 |
| CT4 [mm] | 0.255 | \|Fi/f4\| + \|Fi/f5\| | 0.51 |
| \|ΔT12\|/CT2 | 0.510 | TDi/SD52 | 1.44 |
| CT4/CT5 | 0.281 | | |

5th Embodiment

Figure 9:
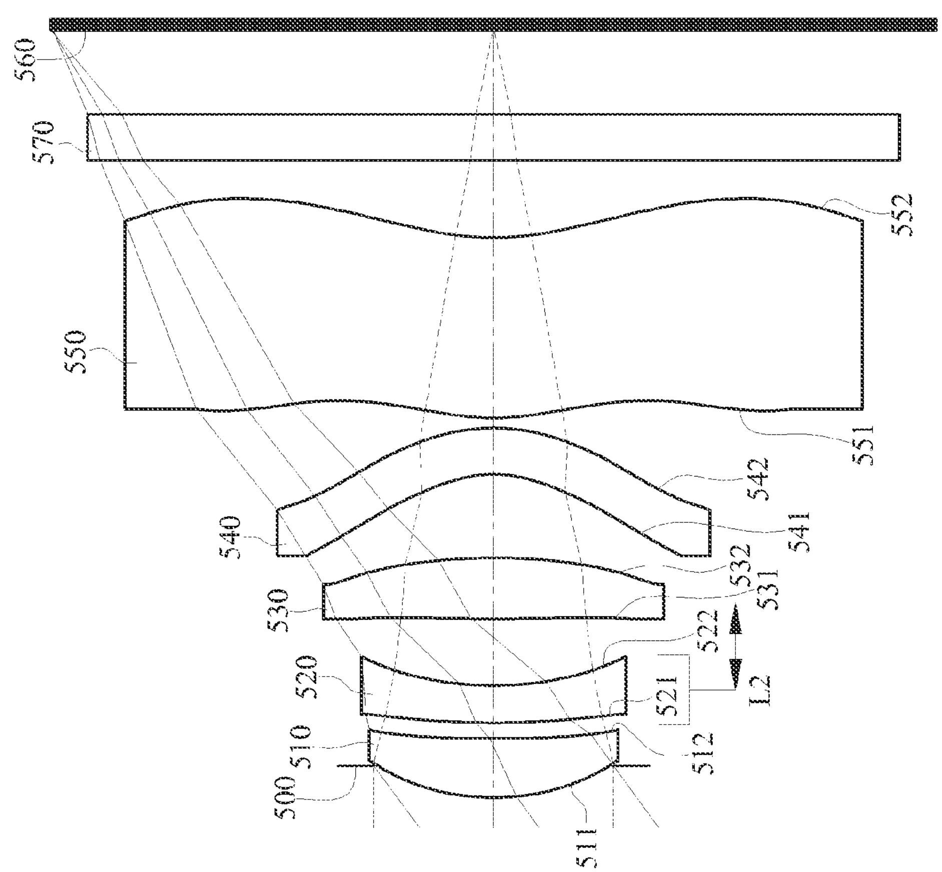
FIG. 9 is a schematic view of a focus adjusting optical lens assembly according to the 5th embodiment of the present disclosure.
Figure 10A:
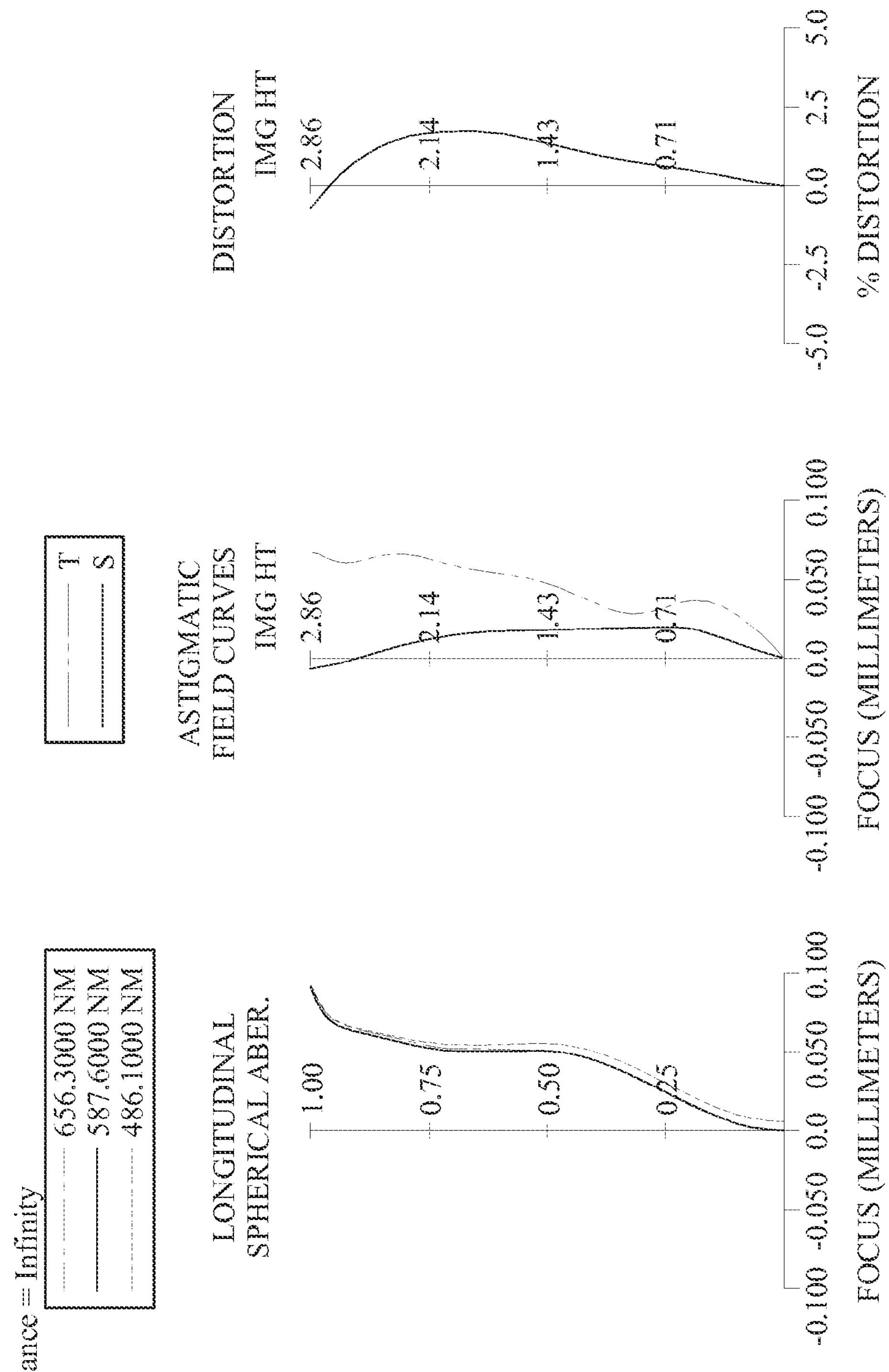
FIG. 10A shows spherical aberration curves, astigmatic field curves and a distortion curve of the focus adjusting optical lens assembly according to the 5th embodiment when the object is at infinity.
Figure 10B:
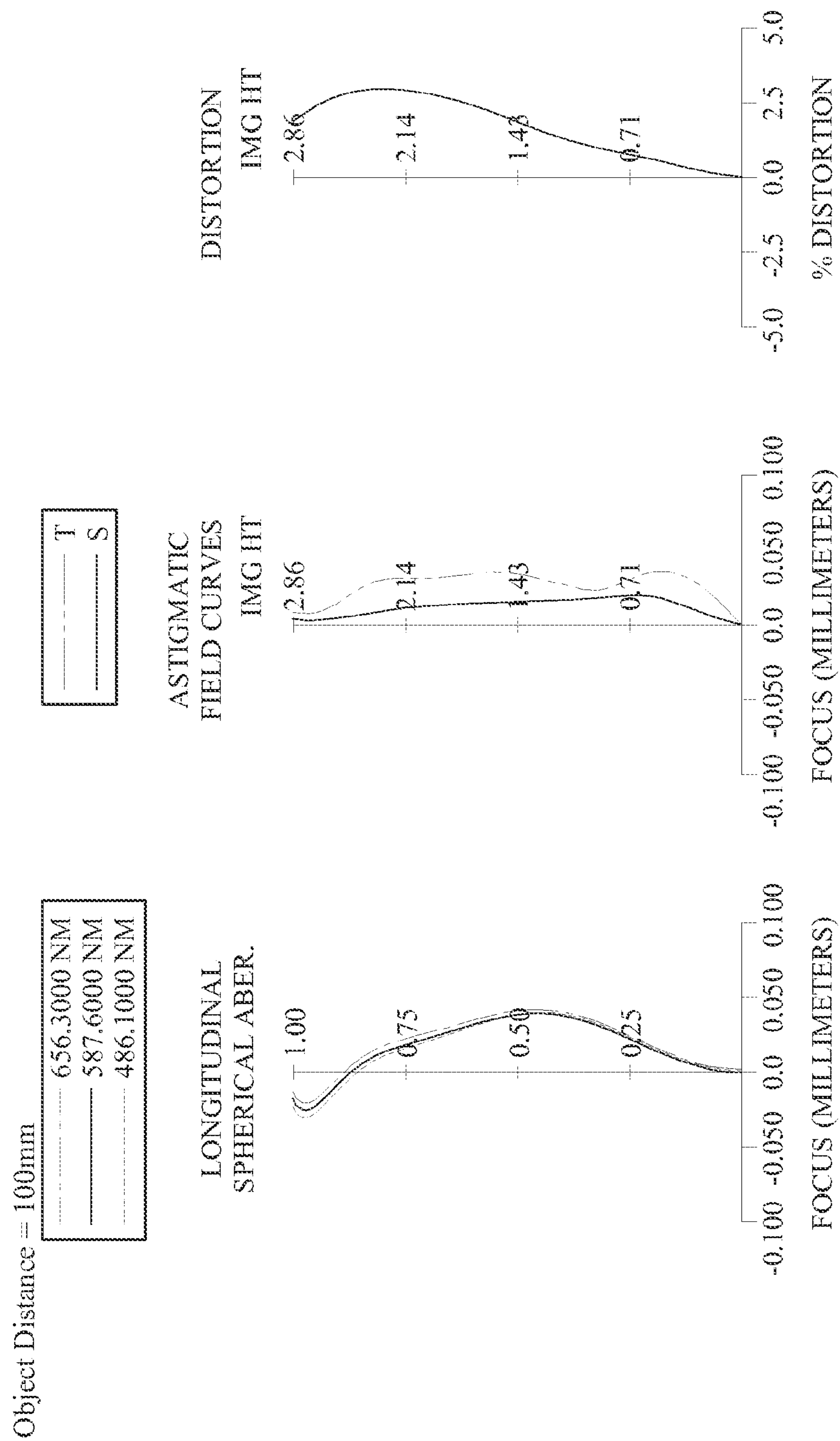
FIG. 10B shows spherical aberration curves, astigmatic field curves and a distortion curve of the focus adjusting optical lens assembly according to the 5th embodiment when the object is at a close distance.

FIG. 9 is a schematic view of a focus adjusting optical lens assembly according to the 5th embodiment of the present disclosure. FIG. 10A shows spherical aberration curves, astigmatic field curves and a distortion curve of the focus adjusting optical lens assembly according to the 5th embodiment when the object is at infinity (i.e. the object distance is infinity). FIG. 10B shows spherical aberration curves, astigmatic field curves and a distortion curve of the focus adjusting optical lens assembly according to the 5th embodiment when the object is at a close distance (i.e. the object distance is 100 mm). In FIG. 9, the focus adjusting optical lens assembly comprises, in order from an object side to an image side, an aperture stop 500, a first lens element 510, a second lens element 520, a third lens element 530, a fourth lens element 540, a fifth lens element 550, an IR-cut filter 570 and an image plane 560. Moreover, the focus adjusting optical lens assembly has a total of five lens elements with refractive power.

The first lens element 510 with positive refractive power has a convex object-side surface 511 and a concave image-side surface 512, and is made of plastic material. The object-side surface 511 and the image-side surface 512 of the first lens element 510 are aspheric.

The second lens element 520 with negative refractive power has a convex object-side surface 521 and a concave image-side surface 522, and is made of plastic material. The object-side surface 521 and the image-side surface 522 of the second lens element 520 are aspheric.

The third lens element 530 with positive refractive power has a convex object-side surface 531 and a convex image-side surface 532, and is made of plastic material. The object-side surface 531 and the image-side surface 532 of the third lens element 530 are aspheric.

The fourth lens element 540 with negative refractive power has a concave object-side surface 541 and a convex image-side surface 542, and is made of plastic material. The object-side surface 541 and the image-side surface 542 of the fourth lens element 540 are aspheric.

The fifth lens element 550 with positive refractive power has a convex object-side surface 551 and a concave image-side surface 552 at a paraxial region, wherein the image-side surface 552 of the fifth lens element 550 changes from concave at the paraxial region to convex at a peripheral region. The fifth lens element 550 is made of plastic material, and the object-side surface 551 and the image-side surface 552 thereof are aspheric.

An IR-cut filter 570 is made of glass and located between the fifth lens element 550 and the image plane 560, and does not affect the focal length of the focus adjusting optical lens assembly.

When the focusing adjustment of the focus adjusting optical lens assembly is performed by moving the second lens element 520 along an optical axis; the first lens element 510, the third lens element 530, the fourth lens element 540, and the fifth lens element 550 are fixed with respect to an image plane 560.

The detailed optical data of the 5th embodiment are shown in Table 9, and the aspheric surface data are shown in Table 10 below.

TABLE 9

| Embodiment 5<br>Object Distance = Infinity: Fi = 3.89 mm, Fno = 2.45, HFOVi = 36.2 deg. | | | | | | | |
|---|---|---|---|---|---|---|---|
| Surface # | | Curvature Radius | Thickness | Material | Index | Abbe # | Focal Length |
| 0 | Object | Plano | Infinity, 100 | | | | |
| 1 | Ape. Stop | Plano | −0.207 | | | | |
| 2 | Lens 1 | 1.522 ASP | 0.381 | Plastic | 1.544 | 55.9 | 3.34 |
| 3 | | 8.540 ASP | 0.104, 0.229 | | | | |
| 4 | Lens 2 | 5.655 ASP | 0.240 | Plastic | 1.639 | 23.5 | −5.70 |
| 5 | | 2.178 ASP | 0.434, 0.309 | | | | |
| 6 | Lens 3 | 13.198 ASP | 0.393 | Plastic | 1.544 | 55.9 | 5.68 |
| 7 | | −3.998 ASP | 0.542 | | | | |
| 8 | Lens 4 | −0.769 ASP | 0.300 | Plastic | 1.639 | 23.5 | −4.58 |
| 9 | | −1.201 ASP | 0.064 | | | | |
| 10 | Lens 5 | 1.427 ASP | 1.168 | Plastic | 1.535 | 55.7 | 6.52 |
| 11 | | 1.727 ASP | 0.500 | | | | |
| 12 | IR-cut filter | Plano | 0.300 | Glass | 1.517 | 64.2 | — |
| 13 | | Plano | 0.547 | | | | |
| 14 | Image | Plano | — | | | | |

Note:
Reference wavelength (d-line) is 587.6 nm.
*Half of the effective diameter of the aperture stop at Surface 1 is 0.774 mm.
* Object Distance = 100 mm: surface 3 thickness = 0.229 mm, surface 5 thickness = 0.309 mm, Fm = 3.81 mm

TABLE 10

| Aspheric Coefficients | | | | | |
|---|---|---|---|---|---|
| Surface # | 2 | 3 | 4 | 5 | 6 |
| k = | −1.5759E−01 | 1.7011E+00 | −1.5125E+01 | −4.2900E+00 | −1.0000E+00 |
| A4 = | 1.1075E−02 | 2.7355E−02 | −1.0081E−02 | 5.1458E−02 | −4.0309E−02 |
| A6 = | 4.1587E−02 | 4.1123E−03 | 5.4351E−02 | 3.9103E−03 | −2.2757E−02 |
| A8 = | −1.5514E−02 | −1.0059E−02 | −1.0359E−01 | 6.4801E−02 | 4.4298E−02 |
| A10 = | −2.6193E−02 | 2.5239E−01 | 1.4419E−01 | −5.0762E−02 | −5.5296E−02 |
| A12 = | 9.4989E−02 | −5.0210E−01 | −1.0336E−01 | −3.5203E−03 | −5.8552E−02 |
| A14 = | −1.3758E−02 | 3.6366E−01 | −1.1985E−02 | 2.0957E−02 | 1.6342E−01 |
| A16 = | — | — | — | — | −7.0845E−02 |
| Surface # | 7 | 8 | 9 | 10 | 11 |
| k = | 2.9455E+00 | −4.3276E+00 | −6.2892E−01 | −1.3591E+01 | −6.6883E+00 |
| A4 = | −2.4064E−03 | −8.7688E−02 | 9.6326E−02 | −1.1566E−01 | −4.9018E−02 |
| A6 = | −4.9014E−02 | −1.4380E−02 | −4.5096E−02 | 5.7284E−02 | 1.8662E−02 |
| A8 = | 4.9454E−02 | 1.0398E−01 | 3.1390E−02 | −3.1433E−02 | −7.3126E−03 |
| A10 = | −1.9978E−02 | −6.1616E−02 | 1.0362E−02 | 1.4674E−02 | 1.9726E−03 |
| A12 = | −3.2972E−02 | 7.4984E−03 | −4.1479E−03 | −3.8249E−03 | −3.2809E−04 |
| A14 = | 3.4048E−02 | 9.2849E−03 | −2.4985E−03 | 4.9876E−04 | 2.9709E−05 |
| A16 = | — | −4.5383E−03 | 6.7140E−04 | −2.5830E−05 | −1.0819E−06 |

In the focus adjusting optical lens assembly according to the 5th embodiment, the definitions of these parameters shown in the following table are the same as those stated in the 1st embodiment with corresponding values for the 5th embodiment.

| | | | |
|---|---|---|---|
| Fi [mm] | 3.89 | TLi [mm] | 4.973 |
| Fm [mm] | 3.81 | (\|TLi − TLm\|/TLi) × 10 | 0.01 |
| HFOVi [deg.] | 36.2 | Fi/Fm | 1.02 |
| HFOVm [deg.] | 34.9 | Fi/f3 | 0.68 |
| Fno | 2.45 | Fi/f4 | −0.85 |
| (V2 + V4)/V1 | 0.84 | Fi/f5 | 0.60 |
| CT4 [mm] | 0.300 | \|Fi/f4\| + \|Fi/f5\| | 1.44 |
| \|ΔT12\|/CT2 | 0.529 | TDi/SD52 | 1.52 |
| CT4/CT5 | 0.257 | | |

6th Embodiment

Figure 11:
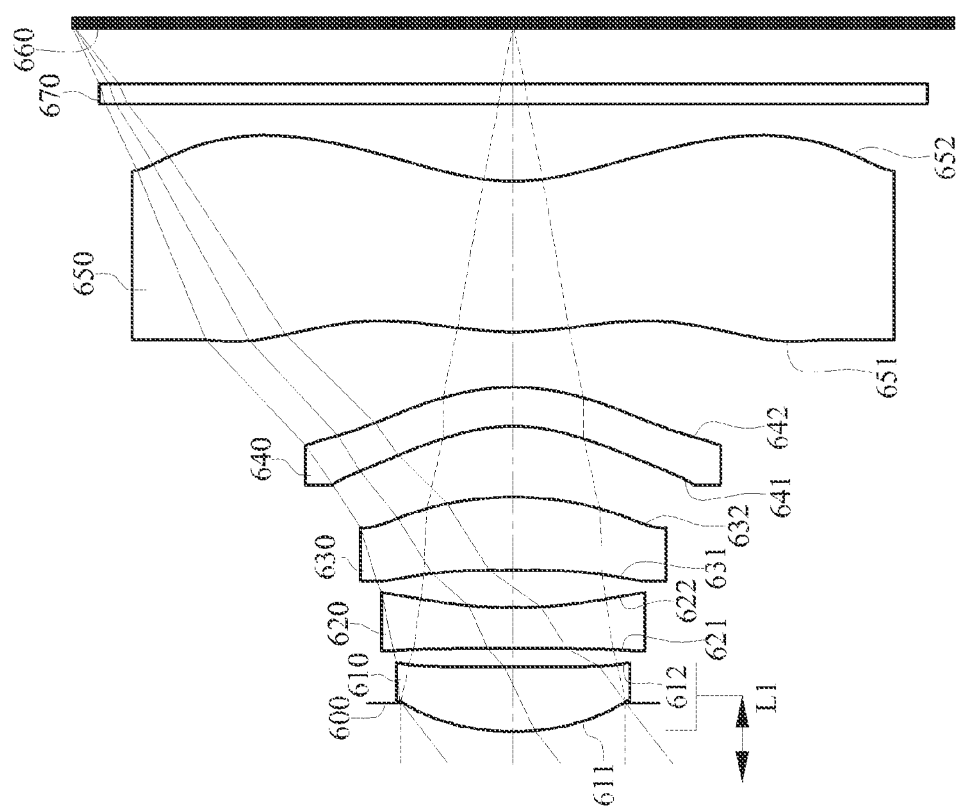
FIG. 11 is a schematic view of a focus adjusting optical lens assembly according to the 6th embodiment of the present disclosure.
Figure 12A:
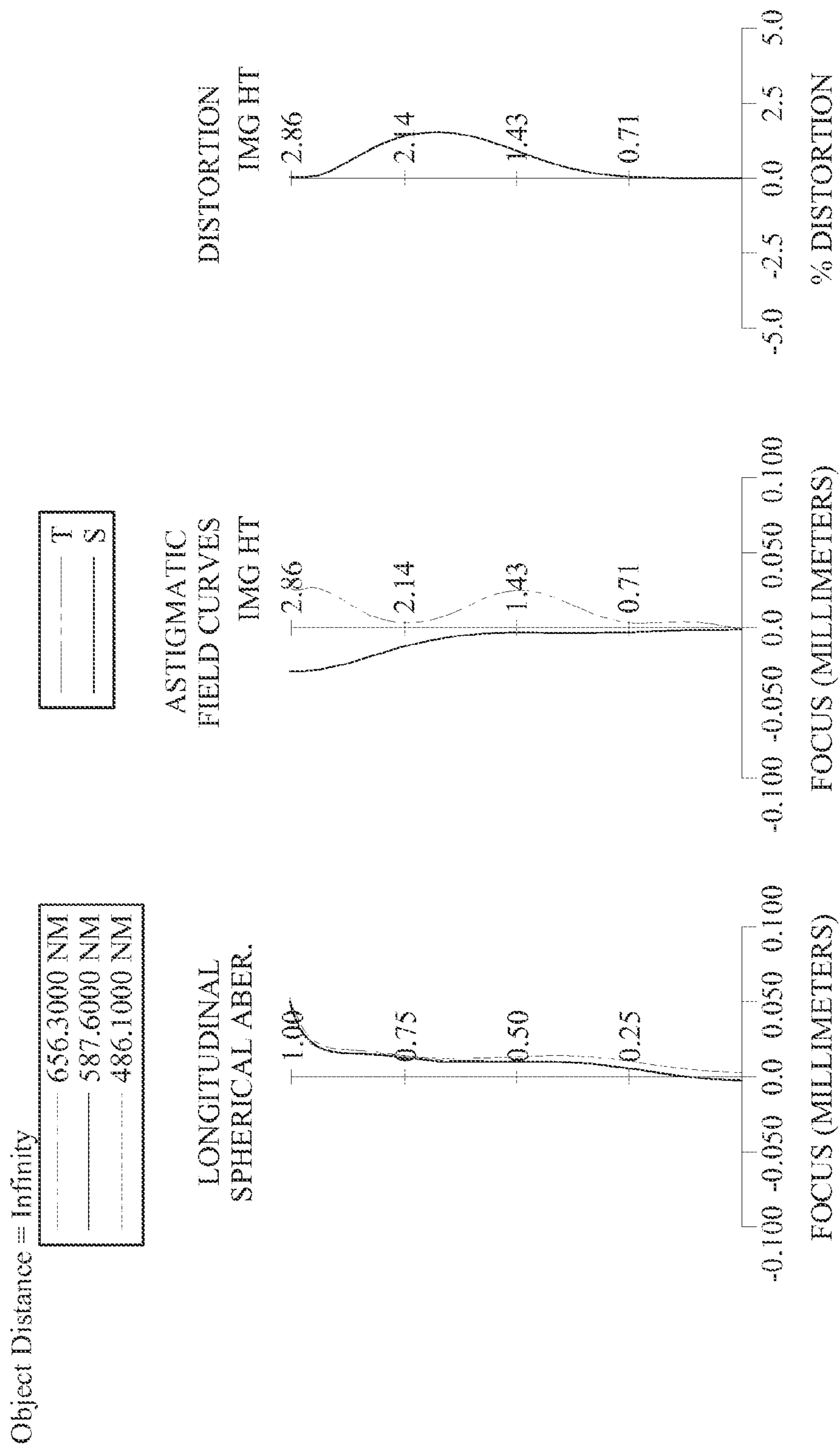
FIG. 12A shows spherical aberration curves, astigmatic field curves and a distortion curve of the focus adjusting optical lens assembly according to the 6th embodiment when the object is at infinity.
Figure 12B:
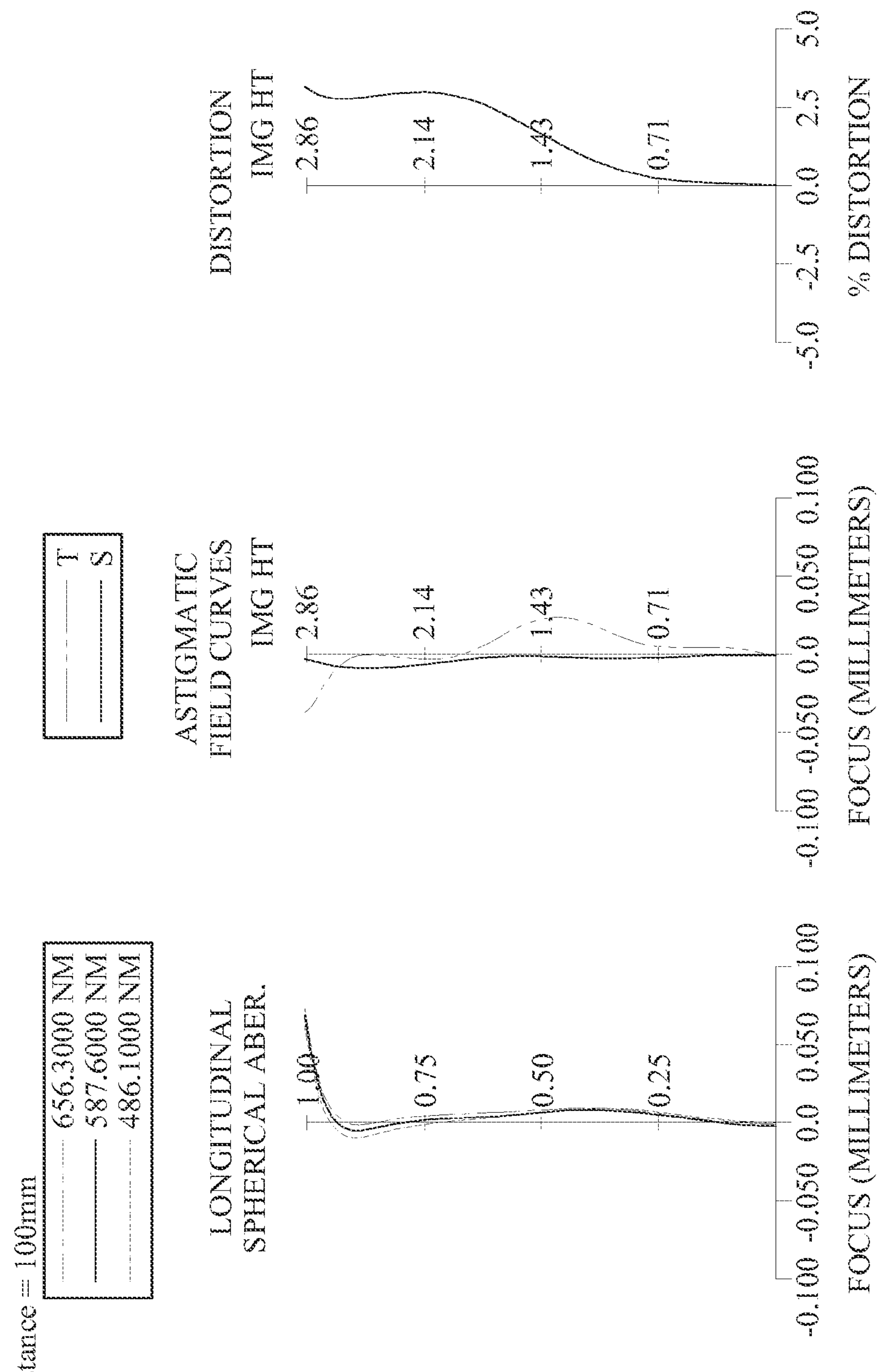
FIG. 12B shows spherical aberration curves, astigmatic field curves and a distortion curve of the focus adjusting optical lens assembly according to the 6th embodiment when the object is at a close distance.

FIG. 11 is a schematic view of a focus adjusting optical lens assembly according to the 6th embodiment of the present disclosure. FIG. 12A shows spherical aberration curves, astigmatic field curves and a distortion curve of the focus adjusting optical lens assembly according to the 6th embodiment when the object is at infinity (i.e. the object distance is infinity). FIG. 12B shows spherical aberration curves, astigmatic field curves and a distortion curve of the focus adjusting optical lens assembly according to the 6th embodiment when the object is at a close distance (i.e. the object distance is 100 mm). In FIG. 11, the focus adjusting optical lens assembly comprises, in order from an object side to an image side, an aperture stop 600, a first lens element 610, a second lens element 620, a third lens element 630, a fourth lens element 640, a fifth lens element 650, an IR-cut filter 670 and an image plane 660. Moreover, the focus adjusting optical lens assembly has a total of five lens elements with refractive power.

The first lens element 610 with positive refractive power has a convex object-side surface 611 and a convex image-side surface 612, and is made of plastic material. The object-side surface 611 and the image-side surface 612 of the first lens element 610 are aspheric.

The second lens element 620 with negative refractive power has a concave object-side surface 621 and a concave image-side surface 622, and is made of plastic material. The object-side surface 621 and the image-side surface 622 of the second lens element 620 are aspheric.

The third lens element 630 with positive refractive power has a concave object-side surface 631 and a convex image-side surface 632, and is made of plastic material. The object-side surface 631 and the image-side surface 632 of the third lens element 630 are aspheric.

The fourth lens element 640 with negative refractive power has a concave object-side surface 641 and a convex image-side surface 642, and is made of plastic material. The object-side surface 641 and the image-side surface 642 of the fourth lens element 640 are aspheric.

The fifth lens element 650 with negative refractive power has a convex object-side surface 651 and a concave image-side surface 652 at a paraxial region, wherein the image-side surface 652 of the fifth lens element 650 changes from concave at the paraxial region to convex at a peripheral region. The fifth lens element 650 is made of plastic material, and the object-side surface 651 and the image-side surface 652 thereof are aspheric.

An IR-cut filter 670 is made of glass and located between the fifth lens element 650 and the image plane 660, and does not affect the focal length of the focus adjusting optical lens assembly.

When the focusing adjustment of the focus adjusting optical lens assembly is performed by moving the first lens element 610 along an optical axis; the second lens element 620, the third lens element 630, the fourth lens element 640, and the fifth lens element 650 are fixed with respect to an image plane 660.

The detailed optical data of the 6th embodiment are shown in Table 11, and the aspheric surface data are shown in Table 12 below.

TABLE 11

| Embodiment 6<br>Object Distance = Infinity: Fi = 3.67 mm, Fno = 2.45, HFOVi = 37.8 deg. | | | | | | | |
|---|---|---|---|---|---|---|---|
| Surface # | | Curvature Radius | Thickness | Material | Index | Abbe # | Focal Length |
| 0 | Object | Plano | Infinity, 100 | | | | |
| 1 | Ape. Stop | Plano | −0.189 | | | | |
| 2 | Lens 1 | 1.566 ASP | 0.423 | Plastic | 1.544 | 55.9 | 2.83 |
| 3 | | −77.672 ASP | 0.119, 0.195 | | | | |
| 4 | Lens 2 | −75.156 ASP | 0.266 | Plastic | 1.640 | 23.3 | −4.33 |
| 5 | | 2.878 ASP | 0.244 | | | | |
| 6 | Lens 3 | −11.969 ASP | 0.477 | Plastic | 1.544 | 55.9 | 4.91 |
| 7 | | −2.215 ASP | 0.463 | | | | |
| 8 | Lens 4 | −1.135 ASP | 0.255 | Plastic | 1.640 | 23.3 | −12.86 |
| 9 | | −1.432 ASP | 0.360 | | | | |
| 10 | Lens 5 | 2.031 ASP | 0.982 | Plastic | 1.535 | 55.7 | −14.99 |
| 11 | | 1.348 ASP | 0.505 | | | | |
| 12 | IR-cut filter | Plano | 0.132 | Glass | 1.517 | 64.2 | — |
| 13 | | Plano | 0.363 | | | | |
| 14 | Image | Plano | — | | | | |

Note:

Reference wavelength (d-line) is 587.6 nm.

*Half of the effective diameter of the aperture stop at Surface 1 is 0.732 mm.

* Object Distance = 100 mm: surface 3 thickness = 0.195 mm, Fm = 3.60 mm

TABLE 12

| Aspheric Coefficients | | | | | |
|---|---|---|---|---|---|
| Surface # | 2 | 3 | 4 | 5 | 6 |
| k = | 2.1090E−01 | −2.3107E+00 | −1.9459E+01 | −1.8638E+01 | 4.7122E+00 |
| A4 = | 8.1571E−03 | 4.9097E−02 | −3.4302E−02 | 3.5145E−02 | −1.1184E−01 |
| A6 = | 3.5293E−02 | 2.0594E−02 | 1.0375E−01 | −4.5487E−02 | 3.6659E−03 |
| A8 = | −1.8578E−02 | 2.4546E−02 | −2.7053E−01 | 3.5069E−02 | −2.8445E−02 |
| A10 = | 2.4927E−02 | 1.4171E−01 | 1.9506E−01 | −9.2682E−02 | 3.8510E−02 |
| A12 = | 1.3496E−01 | −3.9260E−01 | 1.6137E−01 | 2.2376E−02 | 1.0976E−01 |
| A14 = | −2.6118E−02 | 6.0533E−01 | −2.4938E−01 | 5.2524E−02 | 8.7211E−02 |
| A16 = | — | — | — | — | −1.0549E−01 |
| Surface # | 7 | 8 | 9 | 10 | 11 |
| k = | −1.7322E+00 | −5.7171E+00 | −7.6836E−01 | −1.6485E+01 | −6.0750E+00 |
| A4 = | −2.3431E−02 | −4.9935E−02 | 9.1960E−02 | −1.2747E−01 | −5.4618E−02 |
| A5 = | — | — | — | 1.3546E−04 | −8.2997E−05 |
| A6 = | −9.4318E−02 | 5.5314E−03 | −2.3053E−02 | 5.8430E−02 | 2.1268E−02 |
| A7 = | — | — | — | 4.8970E−06 | 1.8256E−06 |
| A8 = | 1.1177E−01 | 8.5197E−02 | 2.2561E−02 | −3.0385E−02 | −7.7958E−03 |
| A9 = | — | — | — | 1.1997E−06 | −8.9251E−07 |
| A10 = | 1.1049E−02 | −7.2278E−02 | 4.8626E−03 | 1.4271E−02 | 1.9399E−03 |
| A11 = | — | — | — | 2.2692E−06 | 1.0354E−07 |
| A12 = | −4.7881E−02 | 1.1135E−02 | −5.0554E−03 | −3.7361E−03 | −3.1336E−04 |
| A13 = | — | — | — | −7.3452E−07 | 3.8197E−09 |
| A14 = | 6.3753E−02 | 1.4085E−02 | −2.4874E−03 | 4.8427E−04 | 2.8203E−05 |
| A15 = | — | — | — | 2.8359E−08 | 2.4412E−09 |
| A16 = | — | −8.2309E−03 | 1.0769E−03 | −2.4639E−05 | −9.8840E−07 |

In the focus adjusting optical lens assembly according to the 6th embodiment, the definitions of these parameters shown in the following table are the same as those stated in the 1st embodiment with corresponding values for the 6th embodiment.

| | | | |
|---|---|---|---|
| Fi [mm] | 3.67 | TLi [mm] | 4.588 |
| Fm [mm] | 3.60 | (\|TLi − TLm\|/TLi) × 10 | 0.17 |
| HFOVi [deg.] | 37.8 | Fi/Fm | 1.02 |
| HFOVm [deg.] | 36.1 | Fi/f3 | 0.75 |
| Fno | 2.45 | Fi/f4 | −0.29 |
| (V2 + V4)/V1 | 0.83 | Fi/f5 | −0.25 |
| CT4 [mm] | 0.255 | \|Fi/f4\| + \|Fi/f5\| | 0.53 |
| \|ΔT12\|/CT2 | 0.286 | TDi/SD52 | 1.46 |
| CT4/CT5 | 0.260 | | |

7th Embodiment

Figure 13:
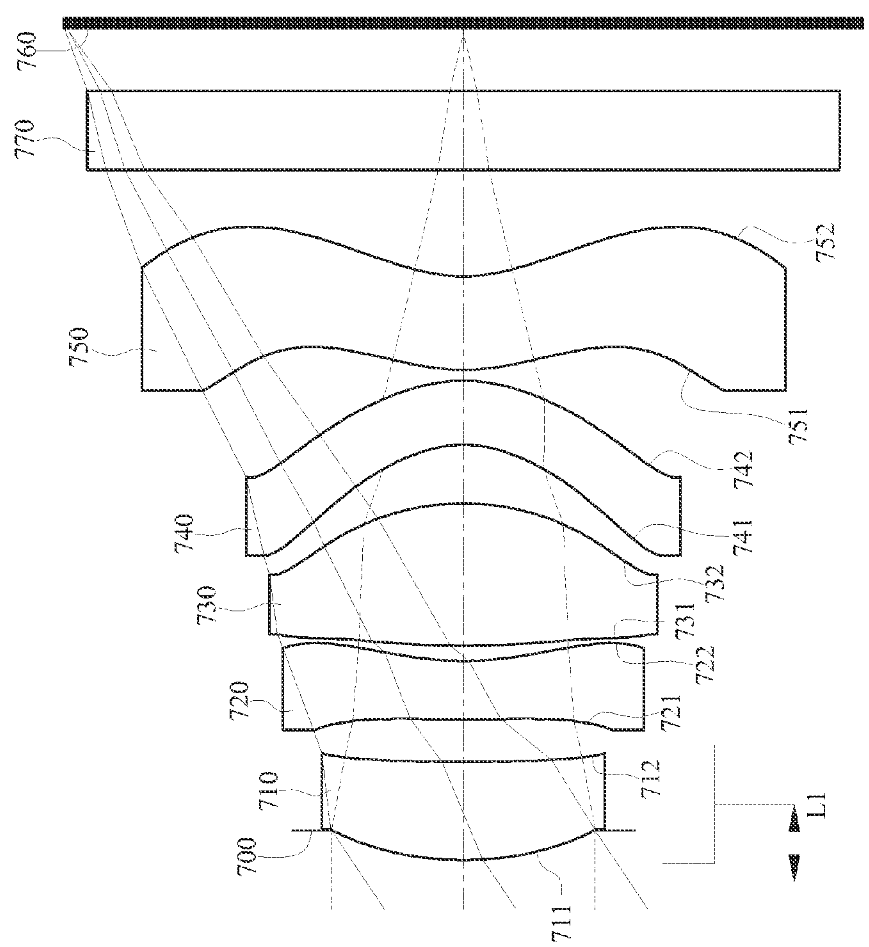
FIG. 13 is a schematic view of a focus adjusting optical lens assembly according to the 7th embodiment of the present disclosure.
Figure 14A:
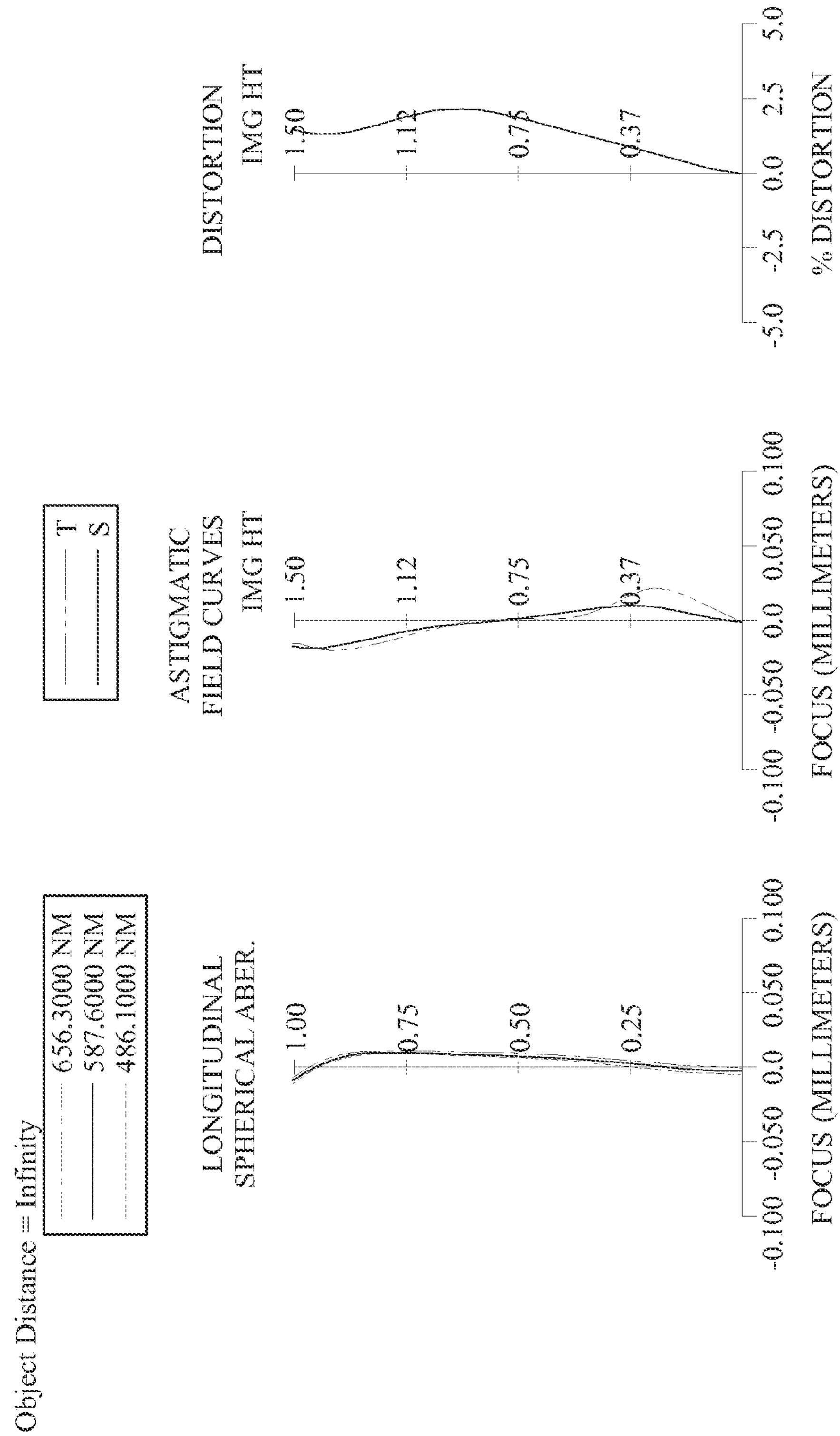
FIG. 14A shows spherical aberration curves, astigmatic field curves and a distortion curve of the focus adjusting optical lens assembly according to the 7th embodiment when the object is at infinity.
Figure 14B:
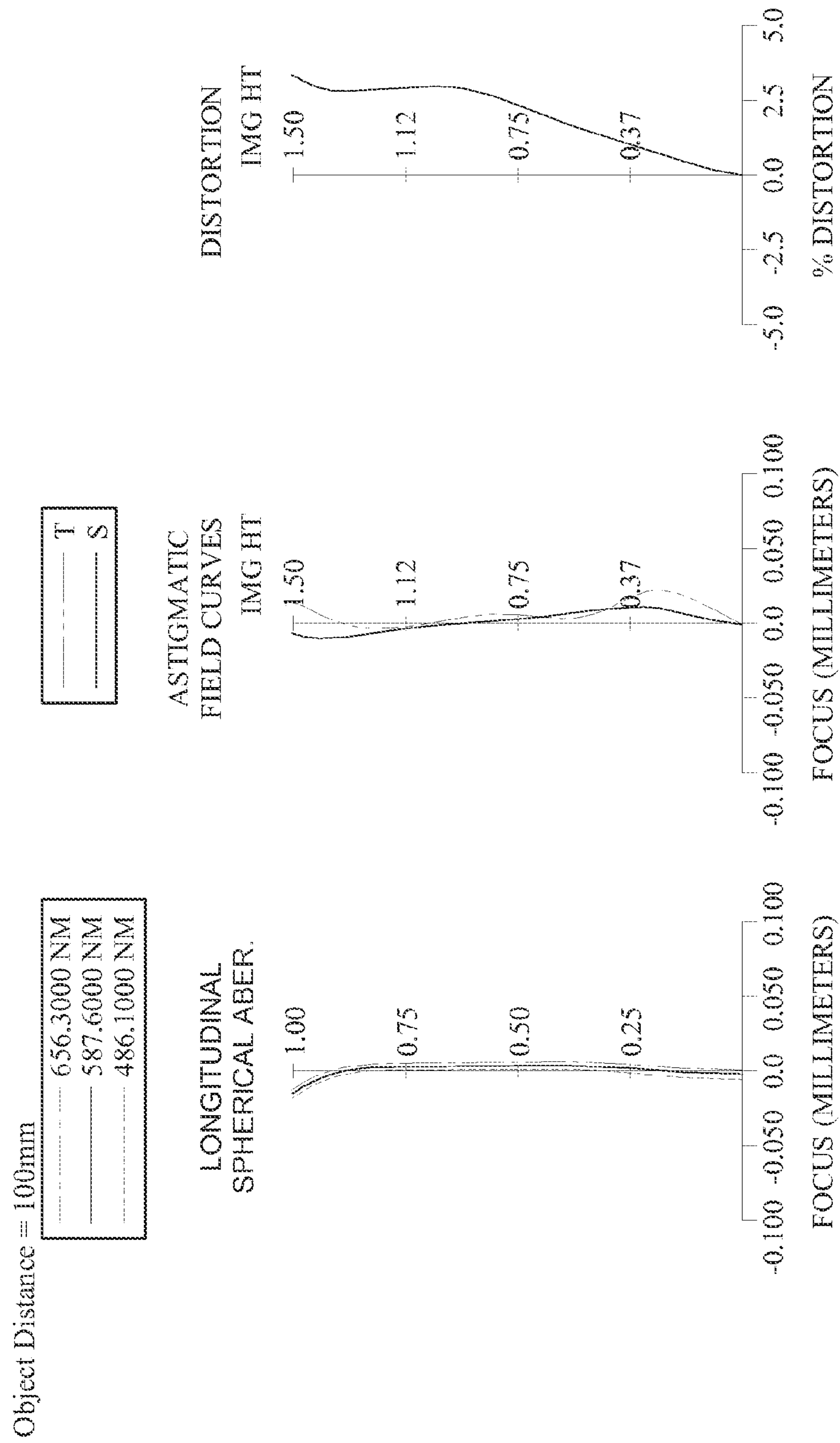
FIG. 14B shows spherical aberration curves, astigmatic field curves and a distortion curve of the focus adjusting optical lens assembly according to the 7th embodiment when the object is at a close distance.

FIG. 13 is a schematic view of a focus adjusting optical lens assembly according to the 7th embodiment of the present disclosure. FIG. 14A shows spherical aberration curves, astigmatic field curves and a distortion curve of the focus adjusting optical lens assembly according to the 7th embodiment when the object is at infinity (i.e. the object distance is infinity). FIG. 14B shows spherical aberration curves, astigmatic field curves and a distortion curve of the focus adjusting optical lens assembly according to the 7th embodiment when the object is at a close distance (i.e. the object distance is 100 mm). In FIG. 13, the focus adjusting optical lens assembly comprises, in order from an object side to an image side, an aperture stop 700, a first lens element 710, a second lens element 720, a third lens element 730, a fourth lens element 740, a fifth lens element 750, an IR-cut filter 770 and an image plane 760. Moreover, the focus adjusting optical lens assembly has a total of five lens elements with refractive power.

The first lens element 710 with positive refractive power has a convex object-side surface 711 and a concave image-side surface 712, and is made of plastic material. The object-side surface 711 and the image-side surface 712 of the first lens element 710 are aspheric.

The second lens element 720 with negative refractive power has a convex object-side surface 721 and a concave image-side surface 722, and is made of plastic material. The object-side surface 721 and the image-side surface 722 of the second lens element 720 are aspheric.

The third lens element 730 with positive refractive power has a convex object-side surface 731 and a convex image-side surface 732, and is made of plastic material. The object-side surface 731 and the image-side surface 732 of the third lens element 730 are aspheric.

The fourth lens element 740 with negative refractive power has a concave object-side surface 741 and a convex image-side surface 742, and is made of plastic material. The object-side surface 741 and the image-side surface 742 of the fourth lens element 740 are aspheric.

The fifth lens element 750 with negative refractive power has a convex object-side surface 751 and a concave image-side surface 752 at a paraxial region, wherein the image-side surface 752 of the fifth lens element 750 changes from concave at the paraxial region to convex at a peripheral region. The fifth lens element 750 is made of plastic material, and the object-side surface 751 and the image-side surface 752 thereof are aspheric.

An IR-cut filter 770 is made of glass and located between the fifth lens element 750 and the image plane 760, and does not affect the focal length of the focus adjusting optical lens assembly.

When the focusing adjustment of the focus adjusting optical lens assembly is performed by moving the first lens element 710 along an optical axis; the second lens element 720, the third lens element 730, the fourth lens element 740, and the fifth lens element 750 are fixed with respect to an image plane 760.

The detailed optical data of the 7th embodiment are shown in Table 13, and the aspheric surface data are shown in Table 14 below.

TABLE 13

| Embodiment 7<br>Object Distance = Infinity: Fi = 2.19 mm, Fno = 2.20, HFOVi = 33.8 deg. | | | | | | | |
|---|---|---|---|---|---|---|---|
| Surface # | | Curvature Radius | Thickness | Material | Index | Abbe # | Focal Length |
| 0 | Object | Plano | Infinity, 100 | | | | |
| 1 | Ape. Stop | Plano | −0.111 | | | | |
| 2 | Lens 1 | 1.219 ASP | 0.372 | Plastic | 1.544 | 55.9 | 2.50 |
| 3 | | 10.327 ASP | 0.160, 0.214 | | | | |
| 4 | Lens 2 | 6.519 ASP | 0.220 | Plastic | 1.639 | 23.5 | −2.22 |
| 5 | | 1.150 ASP | 0.057 | | | | |
| 6 | Lens 3 | 2.882 ASP | 0.538 | Plastic | 1.544 | 55.9 | 1.40 |
| 7 | | −0.965 ASP | 0.222 | | | | |
| 8 | Lens 4 | −0.448 ASP | 0.241 | Plastic | 1.544 | 55.9 | −5.23 |
| 9 | | −0.633 ASP | 0.042 | | | | |
| 10 | Lens 5 | 0.777 ASP | 0.354 | Plastic | 1.535 | 55.7 | −19.73 |
| 11 | | 0.609 ASP | 0.400 | | | | |
| 12 | IR-cut filter | Plano | 0.300 | Glass | 1.517 | 64.2 | — |
| 13 | | Plano | 0.238 | | | | |
| 14 | Image | Plano | — | | | | |

Note:
Reference wavelength (d-line) is 587.6 nm.
*Half of the effective diameter of the aperture stop at Surface 1 is 0.498 mm.
* Object Distance = 100 mm: surface 3 thickness = 0.214 mm, Fm = 2.20 mm

TABLE 14

| Aspheric Coefficients | | | | | |
|---|---|---|---|---|---|
| Surface # | 2 | 3 | 4 | 5 | 6 |
| k = | −1.5410E−02 | 6.4209E+01 | 3.9037E+01 | −2.8383E+00 | −4.3195E+00 |
| A4 = | 3.9163E−02 | 3.9530E−02 | −7.4848E−01 | −6.4106E−01 | −1.5945E−01 |
| A6 = | 5.3858E−01 | 3.5097E−01 | 1.5605E−01 | 4.5320E−01 | −4.2918E−01 |
| A8 = | −1.7503E+00 | 1.2413E+00 | 2.3257E+00 | −3.1110E−01 | 9.2013E−02 |
| A10 = | 4.1428E+00 | −4.3947E+00 | −5.0232E+00 | −1.2133E+00 | 1.4102E+00 |
| A12 = | 8.7827E−01 | 9.3964E+00 | −5.6868E+00 | −2.2691E+00 | 1.3331E+00 |
| A14 = | −4.9156E+00 | 2.5775E+00 | 7.1808E+00 | 5.9399E+00 | −1.4111E+00 |
| A16 = | — | — | — | — | −8.2528E−01 |
| Surface # | 7 | 8 | 9 | 10 | 11 |
| k = | −6.8858E−02 | −2.6256E+00 | −8.4192E−01 | −6.4417E+00 | −4.1346E+00 |
| A4 = | −1.9160E−01 | −4.3865E−01 | 6.1374E−01 | −5.2382E−01 | −3.3512E−01 |
| A6 = | 4.2583E−01 | −5.4791E−01 | −8.2873E−01 | 9.4175E−02 | 1.3516E−01 |
| A8 = | −8.0422E−01 | 1.8562E+00 | 3.0784E−01 | −1.2776E−01 | −6.1491E−02 |
| A10 = | 9.8791E−01 | −8.9241E−01 | 7.0287E−01 | 1.4774E−02 | 9.7377E−03 |
| A12 = | 4.0255E+00 | 1.7758E+00 | 1.9143E−01 | 1.1368E−01 | 3.8897E−03 |
| A14 = | −1.7432E+00 | 2.5568E+00 | −1.1409E−01 | 1.7465E−01 | −6.3306E−04 |
| A16 = | — | −4.5460E+00 | 2.8755E−01 | −1.4081E−01 | — |

In the focus adjusting optical lens assembly according to the 7th embodiment, the definitions of these parameters shown in the following table are the same as those stated in the 1st embodiment with corresponding values for the 7th embodiment.

| | | | |
|---|---|---|---|
| Fi [mm] | 2.19 | TLi [mm] | 3.144 |
| Fm [mm] | 2.20 | (\|TLi − TLm\|/TLi) × 10 | 0.17 |
| HFOVi [deg.] | 33.8 | Fi/Fm | 1.00 |
| HFOVm [deg.] | 32.7 | Fi/f3 | 1.57 |
| Fno | 2.20 | Fi/f4 | −0.42 |
| (V2 + V4)/V1 | 1.42 | Fi/f5 | −0.11 |
| CT4 [mm] | 0.241 | \|Fi/f4\| + \|Fi/f5\| | 0.53 |
| \|ΔT12\|/CT2 | 0.245 | TDi/SD52 | 1.82 |
| CT4/CT5 | 0.681 | | |

8th Embodiment

Figure 15:
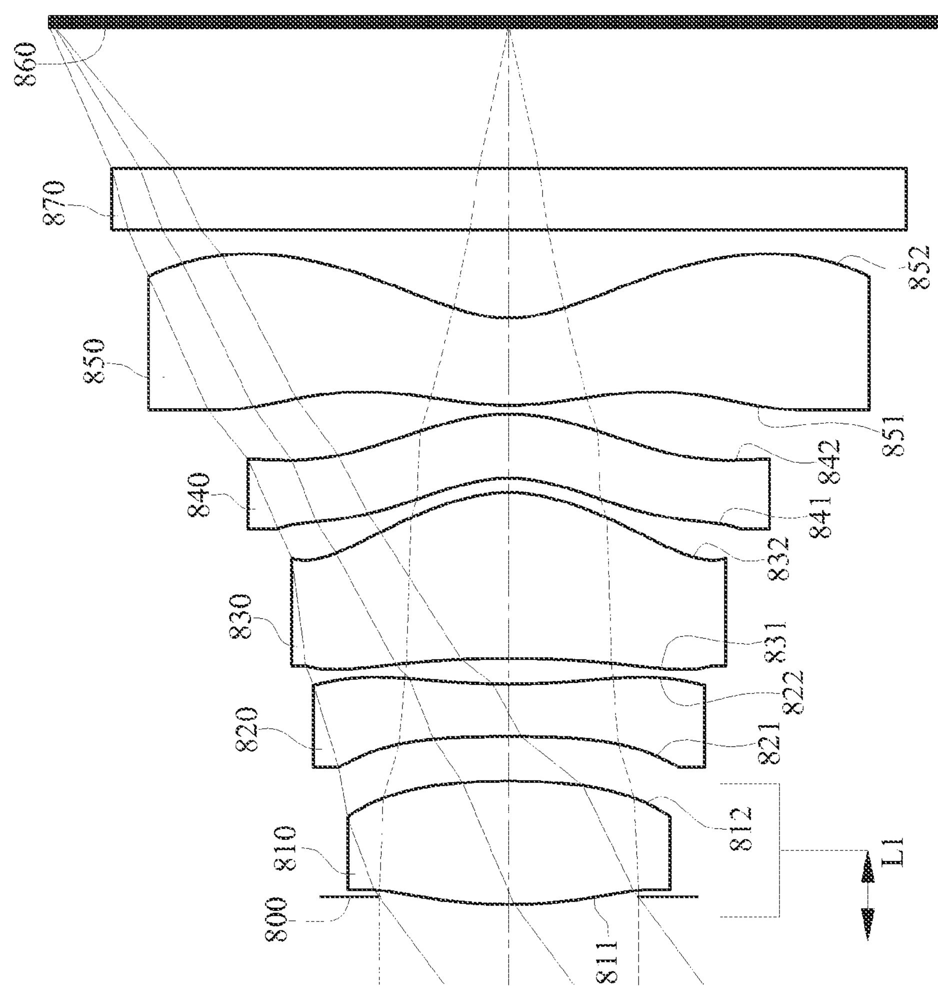
FIG. 15 is a schematic view of a focus adjusting optical lens assembly according to the 8th embodiment of the present disclosure.
Figure 16A:
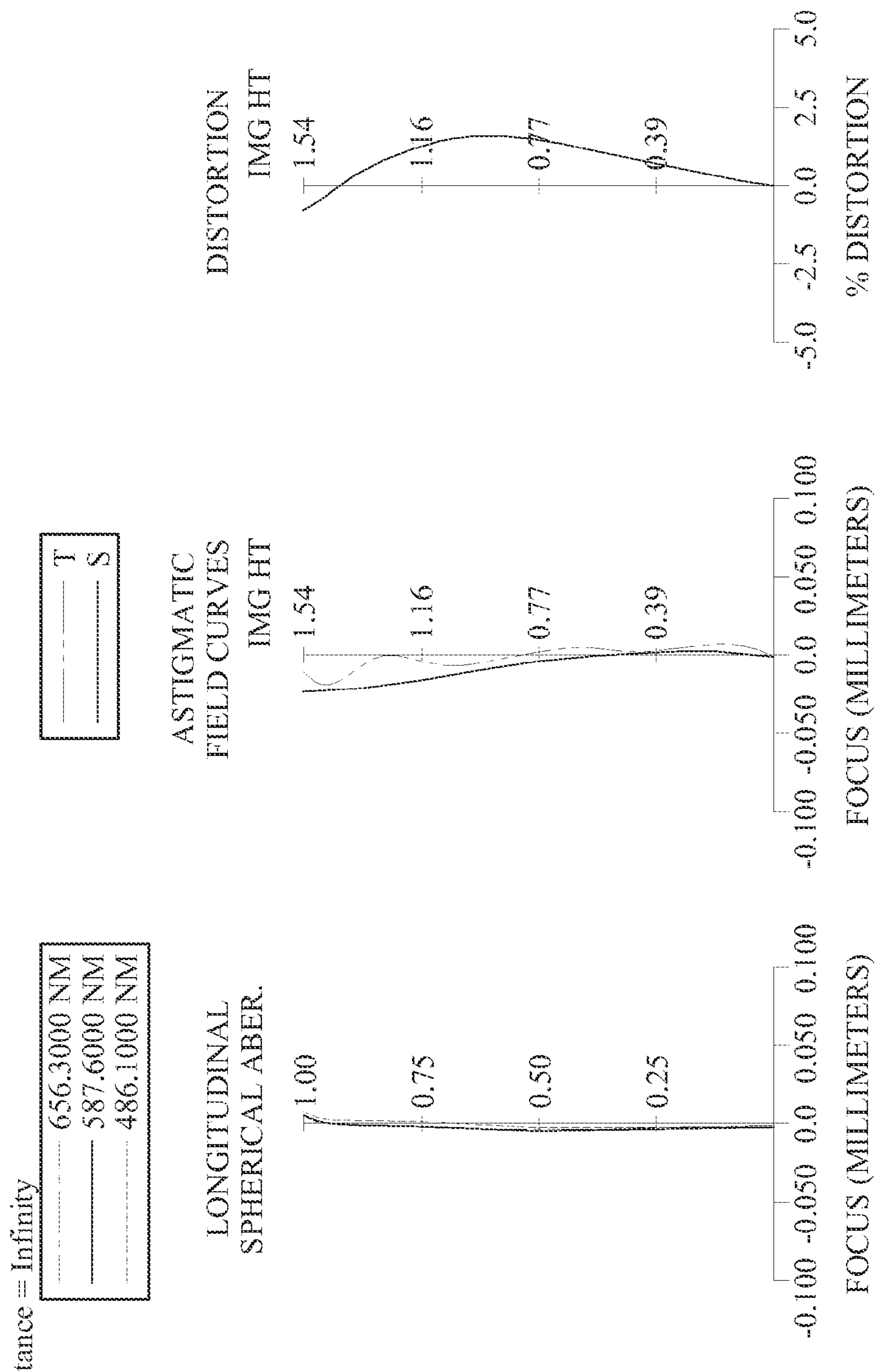
FIG. 16A shows spherical aberration curves, astigmatic field curves and a distortion curve of the focus adjusting optical lens assembly according to the 8th embodiment when the object is at infinity.
Figure 16B:
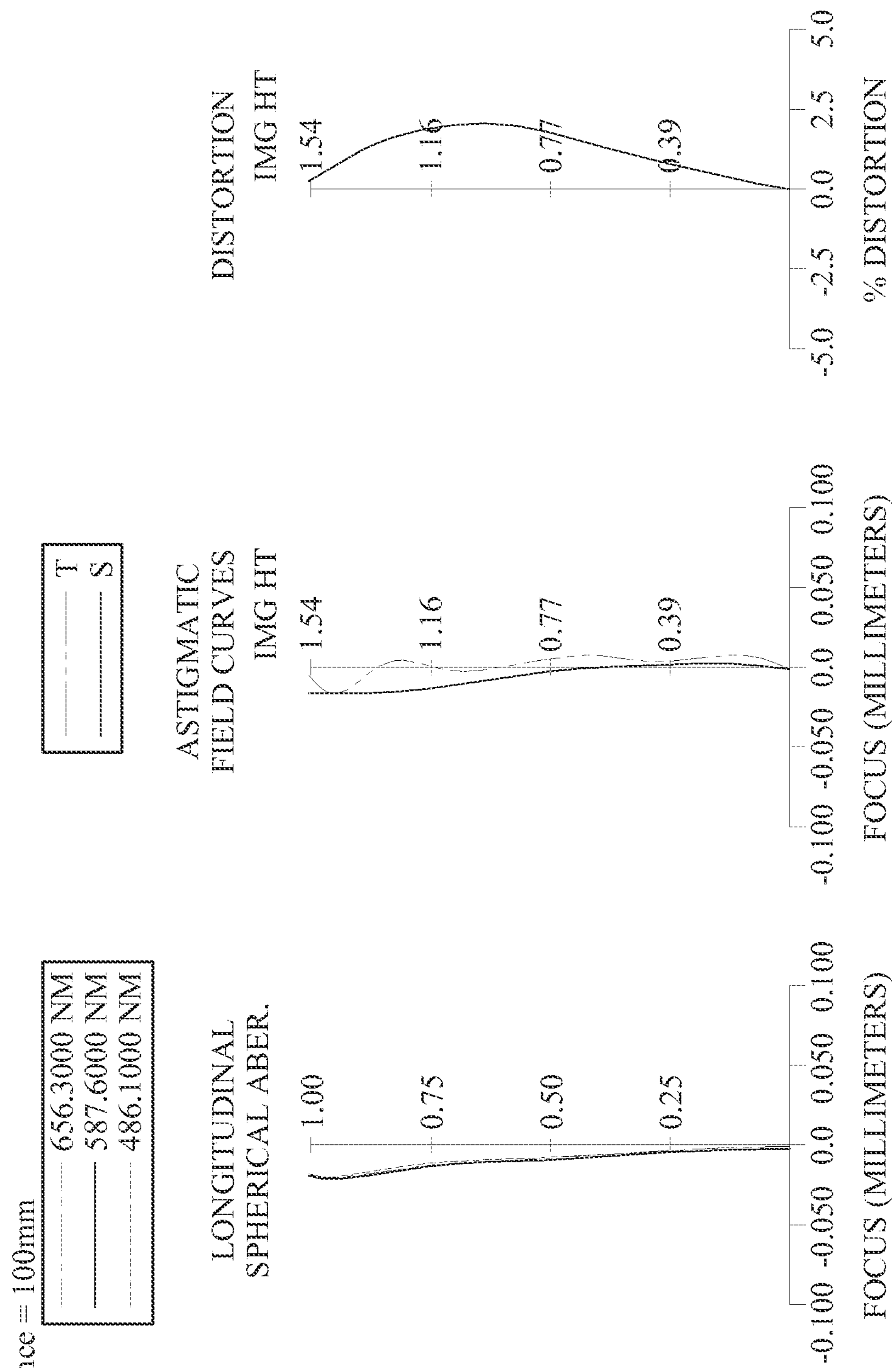
FIG. 16B shows spherical aberration curves, astigmatic field curves and a distortion curve of the focus adjusting optical lens assembly according to the 8th embodiment when the object is at a close distance.

FIG. 15 is a schematic view of a focus adjusting optical lens assembly according to the 8th embodiment of the present disclosure. FIG. 16A shows spherical aberration curves, astigmatic field curves and a distortion curve of the focus adjusting optical lens assembly according to the 8th embodiment when the object is at infinity (i.e. the object distance is infinity). FIG. 16B shows spherical aberration curves, astigmatic field curves and a distortion curve of the focus adjusting optical lens assembly according to the 8th embodiment when the object is at a close distance (i.e. the object distance is 100 mm). In FIG. 15, the focus adjusting optical lens assembly comprises, in order from an object side to an image side, an aperture stop 800, a first lens element 810, a second lens element 820, a third lens element 830, a fourth lens element 840, a fifth lens element 850, an IR-cut filter 870 and an image plane 860. Moreover, the focus adjusting optical lens assembly has a total of five lens elements with refractive power.

The first lens element 810 with positive refractive power has a convex object-side surface 811 and a convex image-side surface 812, and is made of plastic material. The object-side surface 811 and the image-side surface 812 of the first lens element 810 are aspheric.

The second lens element 820 with negative refractive power has a concave object-side surface 821 and a concave image-side surface 822, and is made of plastic material. The object-side surface 821 and the image-side surface 822 of the second lens element 820 are aspheric.

The third lens element 830 with positive refractive power has a concave object-side surface 831 and a convex image-side surface 832, and is made of plastic material. The object-side surface 831 and the image-side surface 832 of the third lens element 830 are aspheric.

The fourth lens element 840 with negative refractive power has a concave object-side surface 841 and a convex image-side surface 842, and is made of plastic material. The object-side surface 841 and the image-side surface 842 of the fourth lens element 840 are aspheric.

The fifth lens element 850 with negative refractive power has a convex object-side surface 851 and a concave image-side surface 852 at a paraxial region, wherein the image-side surface 852 of the fifth lens element 850 changes from concave at the paraxial region to convex at a peripheral region. The fifth lens element 850 is made of plastic material, and the object-side surface 851 and the image-side surface 852 thereof are aspheric.

An IR-cut filter 870 is made of glass and located between the fifth lens element 850 and the image plane 860, and does not affect the focal length of the focus adjusting optical lens assembly.

When the focusing adjustment of the focus adjusting optical lens assembly is performed by moving the first lens element 810 along an optical axis; the second lens element 820, the third lens element 830, the fourth lens element 840, and the fifth lens element 850 are fixed with respect to an image plane 860.

The detailed optical data of the 8th embodiment are shown in Table 15, and the aspheric surface data are shown in Table 16 below.

TABLE 15

| Embodiment 8 | | | | | | | |
|---|---|---|---|---|---|---|---|
| Object Distance = Infinity: Fi = 2.10 mm, Fno = 2.39, HFOVi = 36.5 deg. | | | | | | | |
| Surface # | | Curvature Radius | Thickness | Material | Index | Abbe # | Focal Length |
| 0 | Object | Plano | Infinity, 100 | | | | |
| 1 | Ape. Stop | Plano | −0.025 | | | | |
| 2 | Lens 1 | 1.630 ASP | 0.419 | Plastic | 1.544 | 55.9 | 1.81 |
| 3 | | −2.250 ASP | 0.150, 0.171 | | | | |
| 4 | Lens 2 | −5.856 ASP | 0.180 | Plastic | 1.639 | 23.5 | −2.78 |
| 5 | | 2.575 ASP | 0.086 | | | | |
| 6 | Lens 3 | −3.843 ASP | 0.564 | Plastic | 1.544 | 55.9 | 1.13 |
| 7 | | −0.558 ASP | 0.049 | | | | |
| 8 | Lens 4 | −0.510 ASP | 0.219 | Plastic | 1.634 | 23.8 | −14.70 |
| 9 | | −0.630 ASP | 0.030 | | | | |
| 10 | Lens 5 | 1.073 ASP | 0.295 | Plastic | 1.535 | 55.7 | −1.72 |
| 11 | | 0.448 ASP | 0.300 | | | | |
| 12 | IR-cut filter | Plano | 0.210 | Glass | 1.517 | 64.2 | — |
| 13 | | Plano | 0.478 | | | | |
| 14 | Image | Plano | — | | | | |

Note:
Reference wavelength (d-line) is 587.6 nm.
*Half of the effective diameter of the aperture stop at Surface 1 is 0.44 mm.
* Object Distance = 100 mm: surface 3 thickness = 0.171 mm, Fm = 2.10 mm

TABLE 16

| Aspheric Coefficients | | | | | |
|---|---|---|---|---|---|
| Surface # | 2 | 3 | 4 | 5 | 6 |
| k = | −1.7234E+00 | 1.2835E+01 | −5.0000E+01 | 2.3482E+00 | −2.6492E+00 |
| A4 = | −1.4456E−01 | −2.3812E−01 | −5.6455E−01 | −2.4650E−01 | 6.4468E−02 |
| A6 = | −3.6359E−01 | −2.6296E−01 | −1.1358E+00 | −1.0133E+00 | −1.4150E+00 |
| A8 = | −2.3638E+00 | −9.9628E−01 | 2.5339E+00 | −8.5055E−01 | 6.6595E+00 |
| A10 = | 4.2173E+00 | 1.8986E+00 | −6.6099E+00 | 1.2371E+01 | −5.6693E+00 |
| A12 = | 3.8831E+00 | 1.0890E+01 | 2.4693E+01 | −3.2220E+01 | −1.6309E+01 |
| A14 = | −7.5160E+01 | −2.0975E+01 | −2.3682E+01 | 3.2078E+01 | 4.2402E+01 |
| A16 = | — | — | — | — | −2.7783E+01 |
| Surface # | 7 | 8 | 9 | 10 | 11 |
| k = | −2.8771E+00 | −4.1553E+00 | −5.8072E+00 | −3.6113E+00 | −3.9490E+00 |
| A4 = | 2.0162E−01 | 6.9827E−01 | −1.3605E−01 | −1.5637E+00 | −6.6898E−01 |
| A6 = | −9.1004E−01 | −6.8611E−01 | 2.1312E+00 | 3.8918E+00 | 1.2751E+00 |
| A8 = | 3.2042E+00 | 3.9984E+00 | −5.4735E+00 | −7.8781E+00 | −1.9747E+00 |
| A10 = | −4.1534E+00 | −1.8383E+01 | 8.7219E+00 | 1.0988E+01 | 2.0537E+00 |
| A12 = | 5.7210E+00 | 3.8013E+01 | −8.3376E+00 | −8.9533E+00 | −1.3294E+00 |
| A14 = | −3.4157E+00 | −3.8622E+01 | 3.7874E+00 | 3.8495E+00 | 4.7690E−01 |
| A16 = | — | 1.4995E+01 | −5.1622E−01 | −6.8298E−01 | −7.1714E−02 |

In the focus adjusting optical lens assembly according to the 8th embodiment, the definitions of these parameters shown in the following table are the same as those stated in the 1st embodiment with corresponding values for the 8th embodiment.

| | | | |
|---|---|---|---|
| Fi [mm] | 2.10 | TLi [mm] | 2.980 |
| Fm [mm] | 2.10 | (\|TLi − TLm\|/TLi) × 10 | 0.08 |
| HFOVi [deg.] | 36.5 | Fi/Fm | 1.00 |
| HFOVm [deg.] | 35.8 | Fi/f3 | 1.86 |
| Fno | 2.39 | Fi/f4 | −0.14 |
| (V2 + V4)/V1 | 0.85 | Fi/f5 | −1.22 |
| CT4 [mm] | 0.219 | \|Fi/f4\| + \|Fi/f5\| | 1.36 |
| \|ΔT12\|/CT2 | 0.117 | TDi/SD52 | 1.63 |
| CT4/CT5 | 0.742 | | |

It is to be noted that TABLES 1-16 show different data of the different embodiments; however, the data of the different embodiments are obtained from experiments. Therefore, any imaging lens system of the same structure is considered to be less than or equal to the scope of the present disclosure even if it uses different data. The embodiments depicted above and the appended drawings are exemplary and are not intended to limit the scope of the present disclosure.

What is claimed is:

1. A focus adjusting optical lens assembly comprising, in order from an object side to an image side:

a first lens element with positive refractive power having a convex object-side surface;

a second lens element having negative refractive power;

a third lens element having refractive power;

a fourth lens element with negative refractive power having a concave object-side surface and a convex image-side surface; and a fifth lens element with refractive power having a concave image-side surface at a paraxial region, wherein the image-side surface of the fifth lens element changes from concave at the paraxial region to convex at a peripheral region, and an object-side surface and the image-side surface of the fifth lens element are aspheric;

wherein an object moves closer towards or further away the focus adjusting optical lens assembly, the focusing adjustment is performed by adjusting an axial distance between the first lens element and the second lens element along an optical axis;

wherein the focusing adjustment of the focus adjusting optical lens assembly is performed by moving the first lens element along the optical axis, and the second lens element, the third lens element, the fourth lens element, and the fifth lens element are fixed with respect to an image plane; and wherein the focus adjusting optical lens assembly has a total of five lens elements with refractive power, a difference of an axial distance between the first lens element and the second lens element of the focus adjusting optical lens assembly focused on the object at a close distance and infinity is ΔT12, a central thickness of the second lens element is CT2, and the following relationship is satisfied:

$$0.05<|\Delta T12|/CT2<0.80.$$

2. The focus adjusting optical lens assembly of claim 1, wherein at least one of an object-side surface and an image-side surface of the third lens element is aspheric, the third lens element is made of plastic material, at least one of the object-side surface and the image-side surface of the fourth lens element is aspheric, and the fourth lens element is made of plastic material.

3. The focus adjusting optical lens assembly of claim 2, wherein a distance between the object-side surface of the first lens element and the image plane of the focus adjusting optical lens assembly focused on the object at infinity is TLi, a distance between the object-side surface of the first lens element and the image plane of the focus adjusting optical lens assembly focused on the object at a close distance is TLm, and the following relationship is satisfied:

$$(|TLi-TLm|/TLi)\times 10<0.5.$$

4. The focus adjusting optical lens assembly of claim 3, wherein the image-side surface of the second lens element is concave.

5. The focus adjusting optical lens assembly of claim 3, wherein the third lens element has positive refractive power.

6. The focus adjusting optical lens assembly of claim 5, wherein the third lens element has a convex image-side surface.

7. The focus adjusting optical lens assembly of claim 6, wherein a focal length of the focus adjusting optical lens assembly focused on the object at infinity is Fi, a focal length of the fourth lens element is f4, and the following relationship is satisfied:

$$-1.0<Fi/f4<0.$$

8. The focus adjusting optical lens assembly of claim 6, wherein a focal length of the focus adjusting optical lens assembly focused on the object at infinity is Fi, a focal length of the fifth lens element is f5, and the following relationship is satisfied:

$$-0.7<Fi/f5<0.7.$$

9. The focus adjusting optical lens assembly of claim 6, wherein a distance between the object-side surface of the first lens element and the image-side surface of the fifth lens element of the focus adjusting optical lens assembly focused on the object at infinity is TDi, a vertical distance between a maximum effective diameter position on the image-side surface of the fifth lens element and the optical axis is SD52, and the following relationship is satisfied:

$$1.25<TDi/SD52<1.75.$$

10. The focus adjusting optical lens assembly of claim 3, wherein a focal length of the focus adjusting optical lens assembly focused on the object at infinity is Fi, a focal length of the fourth lens element is f4, a focal length of the fifth lens element is f5, and the following relationship is satisfied:

$$|Fi/f4|+|Fi/f5|<2.0.$$

11. The focus adjusting optical lens assembly of claim 3, wherein a central thickness of the fourth lens element is CT4, a central thickness of the fifth lens element is CT5, and the following relationship is satisfied:

$$0.15<CT4/CT5<0.80.$$

12. The focus adjusting optical lens assembly of claim 2, wherein a focal length of the focus adjusting optical lens assembly focused on the object at infinity is Fi, a focal length of the focus adjusting optical lens assembly focused on the object at a close distance is Fm, and the following relationship is satisfied:

$$0.95<Fi/Fm<1.10.$$

13. The focus adjusting optical lens assembly of claim 12, further comprising:

a stop located between the object and the first lens element.

14. The focus adjusting optical lens assembly of claim 12, wherein an Abbe number of the first lens element is V1, an Abbe number of the second lens element is V2, an Abbe number of the fourth lens element is V4, and the following relationship is satisfied:

$$0.6<(V2+V4)/V1<1.2.$$

15. The focus adjusting optical lens assembly of claim 12, wherein the object-side surface of the fifth lens element is convex.

16. The focus adjusting optical lens assembly of claim 12, wherein an f-number of the focus adjusting optical lens assembly is Fno, and the following relationship is satisfied:

$$1.8<Fno<3.0.$$

17. The focus adjusting optical lens assembly of claim 12, wherein a central thickness of the fourth lens element is CT4, and the following relationship is satisfied:

$$0.10\text{ mm}<CT4<0.35\text{ mm}.$$

18. The focus adjusting optical lens assembly of claim 12, wherein a distance between the object-side surface of the first lens element and the image plane of the focus adjusting optical lens assembly focused on the object at infinity is TLi, and the following relationship is satisfied:

$$2.0\text{ mm}<TLi<6.0\text{ mm}.$$

19. The focus adjusting optical lens assembly of claim 12, wherein the focal length of the focus adjusting optical lens assembly focused on the object at infinity is Fi, a focal length of the third lens element is f3, and the following relationship is satisfied:

$$0.5<Fi/f3<2.0.$$

* * * * *